(12) United States Patent
Chen et al.

(10) Patent No.: US 8,043,696 B2
(45) Date of Patent: Oct. 25, 2011

(54) MICROLAYER STRUCTURES AND METHODS

(75) Inventors: Hongyu Chen, Lake Jackson, TX (US); Ronald Wevers, Terneuzen (NL); David G. McLeod, Rochester, MI (US)

(73) Assignee: Dow Global Technologies LLC, Midland, MI (US)

( * ) Notice: Subject to any disclaimer, the term of this patent is extended or adjusted under 35 U.S.C. 154(b) by 666 days.

(21) Appl. No.: 11/577,385

(22) PCT Filed: Oct. 20, 2005

(86) PCT No.: PCT/US2005/038103
§ 371 (c)(1),
(2), (4) Date: Feb. 21, 2008

(87) PCT Pub. No.: WO2006/047374
PCT Pub. Date: May 4, 2006

(65) Prior Publication Data
US 2008/0254281 A1    Oct. 16, 2008

Related U.S. Application Data

(60) Provisional application No. 60/621,463, filed on Oct. 22, 2004, provisional application No. 60/717,965, filed on Sep. 16, 2005, provisional application No. 60/718,025, filed on Sep. 16, 2005, provisional application No. 60/725,399, filed on Oct. 11, 2005.

(51) Int. Cl.
*B32B 7/00*    (2006.01)

(52) U.S. Cl. .................. 428/335; 428/411.1; 428/515; 428/516

(58) Field of Classification Search .................. 428/411, 428/515, 516
See application file for complete search history.

(56) References Cited

U.S. PATENT DOCUMENTS

| | | | | |
|---|---|---|---|---|
| 3,579,416 A | * | 5/1971 | Schrenk | 428/516 |
| 3,773,882 A | | 11/1973 | Schrenk | |
| 3,884,606 A | | 5/1975 | Schrenk | |
| 4,046,611 A | | 9/1977 | Sanson | |
| 4,734,317 A | * | 3/1988 | Bothe et al. | 428/215 |
| 4,937,134 A | | 6/1990 | Schrenk et al. | |
| 4,980,227 A | | 12/1990 | Sekiguchi et al. | |
| 5,020,687 A | | 6/1991 | Seizert | |

(Continued)

FOREIGN PATENT DOCUMENTS
DE    2363767    6/1975
(Continued)

OTHER PUBLICATIONS
http://catalog.ides.com/DocSelect.aspx?I=68651&E=84310&DOC=DOWTDS&DS=123&DK=STD&DC=en, May 2009.*

(Continued)

*Primary Examiner* — Hao Le
*Assistant Examiner* — Ronak Patel
(74) *Attorney, Agent, or Firm* — Dobrusin & Thennisch PC

(57) ABSTRACT

Improved microlayer structures and methods typically employing at least 4 stacked layers of polymers (e.g., including alternating layers of components A and B), such as that obtained by coextrusion. The layers each have a thickness of less than about 50 microns. One optional approach involves forming an intermediate form that includes at least one elongated member made from the plurality of layers, from which a shaped composite article may be made.

21 Claims, 7 Drawing Sheets

U.S. PATENT DOCUMENTS

| | | | |
|---|---|---|---|
| 5,047,276 A | 9/1991 | Chomarat et al. | |
| 5,094,788 A | 3/1992 | Schrenk et al. | |
| 5,094,793 A | 3/1992 | Schrenk et al. | |
| 5,126,880 A | 6/1992 | Wheatley et al. | |
| 5,194,212 A | 3/1993 | Bonnett | |
| 5,200,133 A | 4/1993 | Dieul et al. | |
| 5,217,794 A | 6/1993 | Schrenk | |
| 5,260,380 A | 11/1993 | Isayev | |
| 5,269,995 A | 12/1993 | Ramanathan et al. | |
| 5,316,703 A | 5/1994 | Schrenk | |
| 5,339,198 A | 8/1994 | Wheatly et al. | |
| 5,411,805 A * | 5/1995 | Magill | 428/411.1 |
| 5,448,404 A | 9/1995 | Schrenk et al. | |
| 5,529,826 A | 6/1996 | Tailor et al. | |
| 5,540,978 A | 7/1996 | Schrenk | |
| 5,565,053 A | 10/1996 | Happich | |
| 5,568,316 A | 10/1996 | Schrenk et al. | |
| 5,578,370 A | 11/1996 | Ferrar et al. | |
| 5,641,835 A * | 6/1997 | Smith et al. | 525/102 |
| 5,872,067 A | 2/1999 | Meng et al. | |
| 5,885,515 A | 3/1999 | Hudkins | |
| 5,993,711 A | 11/1999 | Grunstra | |
| 6,001,465 A | 12/1999 | Takahashi et al. | |
| 6,045,923 A | 4/2000 | Kok et al. | |
| 6,071,370 A | 6/2000 | Stiles | |
| 6,071,598 A | 6/2000 | Peiffer et al. | |
| 6,268,062 B1 * | 7/2001 | DeMeuse | 428/461 |
| 6,299,246 B1 | 10/2001 | Tomka | |
| 6,346,325 B1 | 2/2002 | Edwards et al. | |
| 6,403,196 B1 | 6/2002 | Bessey et al. | |
| 6,446,991 B1 | 9/2002 | Klais | |
| 6,457,728 B1 | 10/2002 | Klais | |
| 6,485,038 B1 | 11/2002 | Garrard | |
| 6,494,982 B1 | 12/2002 | Muller et al. | |
| 6,495,086 B1 | 12/2002 | Utterhaeghe et al. | |
| 6,525,157 B2 | 2/2003 | Cozewith et al. | |
| 6,557,872 B1 | 5/2003 | Garrard | |
| 6,627,029 B1 | 9/2003 | Muller et al. | |
| 6,656,316 B1 | 12/2003 | Dysterhouse | |
| 6,676,142 B2 | 1/2004 | Allman et al. | |
| 6,682,675 B1 | 1/2004 | Vandangeot et al. | |
| 6,688,616 B1 | 2/2004 | Ziech | |
| 6,710,253 B2 | 3/2004 | Wildschut | |
| 6,713,412 B2 | 3/2004 | Newbill | |
| 6,749,784 B2 | 6/2004 | Blanchon | |
| 6,786,540 B2 | 9/2004 | Friedrich et al. | |
| 6,787,579 B2 | 9/2004 | Czaplichi et al. | |
| 6,794,019 B2 | 9/2004 | Muller et al. | |
| 6,794,033 B2 | 9/2004 | Morin et al. | |
| 6,837,698 B2 | 1/2005 | Floyd et al. | |
| 6,851,687 B2 | 2/2005 | Klais | |
| 6,897,170 B2 | 5/2005 | Barkis et al. | |
| 2001/0028128 A1 | 10/2001 | Blanchon | |
| 2002/0137851 A1* | 9/2002 | Kim et al. | 525/240 |
| 2003/0031837 A1* | 2/2003 | Kody et al. | 428/195 |
| 2003/0057611 A1 | 3/2003 | Utterhaeghe et al. | |
| 2003/0080466 A1 | 5/2003 | Cecchin et al. | |
| 2003/0148096 A1 | 8/2003 | Groten et al. | |
| 2003/0148111 A1* | 8/2003 | Haruta et al. | 428/423.1 |
| 2003/0203230 A1* | 10/2003 | Pellingra et al. | 428/515 |
| 2003/0204017 A1 | 10/2003 | Stevens et al. | |
| 2004/0005475 A1* | 1/2004 | Curie et al. | 428/522 |
| 2004/0012118 A1 | 1/2004 | Perez et al. | |
| 2004/0036302 A1 | 2/2004 | Shuler et al. | |
| 2004/0054086 A1* | 3/2004 | Schauder et al. | 525/193 |
| 2004/0086713 A1 | 5/2004 | Morin et al. | |
| 2004/0122196 A1* | 6/2004 | Pierini et al. | 526/351 |
| 2004/0145092 A1 | 7/2004 | McCollum et al. | |
| 2004/0145093 A1 | 7/2004 | McCollum et al. | |
| 2004/0145094 A1 | 7/2004 | McCollum et al. | |
| 2004/0145095 A1 | 7/2004 | McCollum et al. | |
| 2004/0185732 A1 | 9/2004 | Bonner et al. | |
| 2004/0242103 A1* | 12/2004 | Loos et al. | 442/185 |
| 2005/0249963 A1* | 11/2005 | Obata et al. | 428/523 |
| 2006/0047073 A1* | 3/2006 | Inoue | 525/191 |
| 2009/0068486 A1* | 3/2009 | Blackwell et al. | 428/516 |

FOREIGN PATENT DOCUMENTS

| | | |
|---|---|---|
| DE | 2428396 | 12/1975 |
| DE | 3338513 | 5/1985 |
| EP | 045421 | 7/1981 |
| EP | 305207 B1 | 3/1987 |
| EP | 0324714 | 7/1989 |
| EP | 341 977 | 11/1989 |
| EP | 0630735 A | 5/1994 |
| EP | 0630736 A2 | 12/1994 |
| EP | 0634505 | 1/1995 |
| EP | 0682376 | 11/1995 |
| EP | 0682376 A1 * | 11/1995 |
| EP | 0776762 B1 | 6/1997 |
| EP | 0966560 | 2/1998 |
| EP | 0829529 | 3/1998 |
| EP | 315553 B2 | 5/1998 |
| EP | 855309 B1 | 7/1998 |
| EP | 0647183 B1 | 9/1998 |
| EP | 0921052 | 11/1998 |
| EP | 0924780 | 6/1999 |
| EP | 0936042 | 8/1999 |
| EP | 1041181 | 10/2000 |
| EP | 1044790 | 10/2000 |
| EP | 1 130 303 | 9/2001 |
| EP | 1129873 A2 | 9/2001 |
| EP | 1153824 A2 | 11/2001 |
| EP | 1153824 A3 | 4/2002 |
| EP | 1034211 | 6/2002 |
| EP | 1277573 | 1/2003 |
| EP | 1 314 923 | 5/2003 |
| EP | 0999026 B1 | 8/2003 |
| EP | 1403038 A1 | 3/2004 |
| EP | 1136237 B1 | 9/2004 |
| EP | 1479498 A1 | 11/2004 |
| EP | 1409244 B1 | 10/2007 |
| FR | 2373380 | 7/1978 |
| FR | 2600936 | 1/1988 |
| FR | 2647051 | 11/1990 |
| GB | 471618 | 9/1937 |
| GB | 2279232 | 1/1995 |
| GB | 1420517 | 1/1996 |
| JP | 2001001390 A | 1/2001 |
| JP | 2004187418 A | 7/2002 |
| JP | 2004148993 | 5/2004 |
| JP | 2004331127 A | 11/2004 |
| JP | 2005254007 A | 9/2005 |
| WO | WO 91/11324 | 8/1991 |
| WO | WO 91/17035 | 11/1991 |
| WO | WO 94/12334 | 6/1994 |
| WO | WO 98/13419 | 4/1998 |
| WO | WO 98/42904 | 10/1998 |
| WO | WO 98/46422 | 10/1998 |
| WO | WO 99/33654 | 7/1999 |
| WO | WO9933654 A1 * | 7/1999 |
| WO | WO 0059723 | 3/2000 |
| WO | WO 00/27607 | 5/2000 |
| WO | WO 01/12715 | 2/2001 |
| WO | WO 02/08332 | 1/2002 |
| WO | WO 02/074533 A2 | 9/2002 |
| WO | WO 02/090082 | 11/2002 |
| WO | WO 03/008190 | 1/2003 |
| WO | WO 03/040201 | 5/2003 |
| WO | WO 03/045660 | 5/2003 |
| WO | WO 03/104537 A1 | 12/2003 |
| WO | WO 2004/033509 | 4/2004 |
| WO | WO 2005/035598 | 4/2005 |
| WO | WO 2005/123369 | 12/2005 |
| WO | WO 2006/047366 | 5/2006 |
| WO | WO 2006/047375 | 5/2006 |
| WO | WO 2006/047376 | 5/2006 |
| WO | WO 2006/091245 | 8/2006 |
| WO | WO 2006/107197 | 10/2006 |
| WO | WO 2004/028803 | 4/2007 |

OTHER PUBLICATIONS http://msdssearch.dow.com/PublishedLiteratureDOWCOM/dh_004e/0901b8038004e348.pdf?filepath=versify/pdfs/noreg/746-05501.pdf&fromPage=GetDoc, Feb. 2007.*

Cabrera, "Recycleable All-Polypropylene Composites: Concept, Properties and Manufacturing", Technische Universiteit Eindhoven (2004) (ISBN 90-386-2676-2).

Dooley, "Viscoelastic Flow Effects in Multilayer Polymer Co-extrusion", Technische Universiteit Eindhoven (2002) (ISBN 90-386-2983-4).

Jin, et al., "Structure of Polypropylene Crystallized in Confined Nanolayers", PPS-20: Polymer Nanotechnology Symposium (Jun. 20-24, 2000).

Otocka, E. P., R. J. Roe, N. Y. Hellman, P. M. Muglia, Macromolecules, 4, 507 (1971).

"Technical Data Sheet", 2044, Propex Fabrics, Feb. 3, 2005, XP002399206, www.geotextile.com/products/english_pdf/2044.pdf>.

International Search Report dated Apr. 12, 2006 for Application No. PCT/US2005/038105.

International Search Report dated Oct. 4, 2006 for Application No. PCT/US2005/037729.

International Search Report dated Mar. 9, 2006 for Application No. PCT/US2005/038103.

International Search Report dated Mar. 2, 2006 for Application No. PCT/US2005/038104.

International Search Report dated Apr. 12, 2006 for Application No. PCT/US2005/038091.

Riley et al. "Improvements in impact and abrasion performance of glass fiber thermoplastics by the localized intorduciton of self reinforced polypropylene," p. 1-4, 2003 SPE Automotive Composites Conference.

Dow H507-03Z PolyPropylene Resin—Product Information Sheet.

Dow H503-03Z Polypropylene Resin—Product Information Sheet.

Dow D207.01 Developmental performance Polymer—Product Information Sheet.

Dow DP3000.00 Developmental Performance Plastomer—Product Information Sheet.

Dow DP3000.01 Developmental Plastomer—Production Information Sheet.

Kunststoffe plast Europe Apr. 2004—New Production Process for Fibre Components—pp. 1-4.

Kunststoffe plast Europe Apr. 2004—Design of Fabric reinforced Thermoplastics—pp. 1-4.

Han et al., Morphology and Mechanical Properties of Injection-Molded Specimens of Two-Phase Polymer Blends, Journal of Applied Polymer Science, vol. 21 p. 353-370(1977).

Van Der Sanden et al., Deformation and toughness of polymeric systems: 1. The conception of a critical thickness, Polymer vol. 34, No. 10 1993, p. 2148-2154.

Van Der Sanden et al., Deformation and toughness of polymeric systems: 2. Influence of entanglement density, Polymer vol. 34, No. 14 1993, p. 2961-2970.

Van Der Sanden et al., Deformation and toughness of polymeric systems: 3. Influence of crosslink density, Polymer vol. 34, No. 24 1993 p. 5063-5072.

Van Der Sanden et al., Deformation and toughness of polymeric systems: 4. Influence of strain rate and temperature, Polymer vol. 35, No. 13 1994 p. 2774-2782.

Van Der Sanden et al., Deformation and toughness of polymeric systems: 5. A critical examination of multilayered structures, Polymer vol. 35, No. 13 1994 p. 2783-2994.

Van Der Sanden et al., Deformation and toughness of polymeric systems: 6. Critical thickness of diluted entanglement networks, Polymer vol. 35, No. 14 1994 p. 2991-2994.

Van Der Sanden et al., Deformation and toughness of polymeric systems: 7. Influence of dispersed rubbery phase, Polymer vol. 35, No. 14 1994 p. 2995-3004.

Peijs, Ton, Composites Turn Green!, e-polymers 2002 No. T_002. p. 1, 9-12.

Dow, Affinity GA1900, Polyolefin Plastomer—Production Information Sheet.

Jobwerx manufacturing Network, Manufacturing news center, http://www.jobwerz.com/news/Archives/composites-aerospace.html, Dec. 22, 2003.

Quadrant Plastic Composites—Product Information Sheet.

Bastiaansen, Oriented Structures Based on Flexible Polymers, Jun. 28, 1991.

Copending U.S. Appl. No. 11/577,394, filed Apr. 17, 2007 WO2006/047376A1.

Copending U.S. Appl. No. 11/577,384, filed Apr. 17, 2007 WO2006/091245A3.

Copending U.S. Appl. No. 11/577,393, filed Apr. 17, 2007 WO2006/047375A1.

Copending U.S. Appl. No. 11/577,392, filed Apr. 17, 2007 WO 2006/047366A1.

* cited by examiner

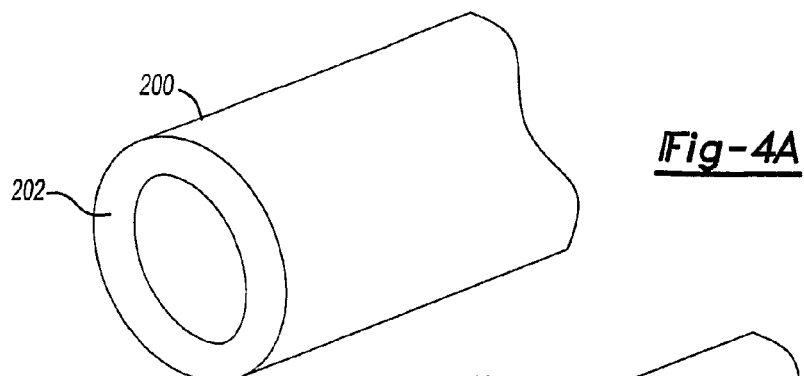
_Fig-4A_
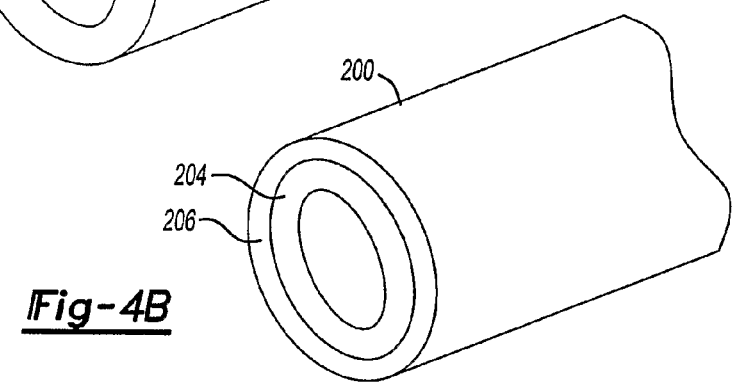
_Fig-4B_
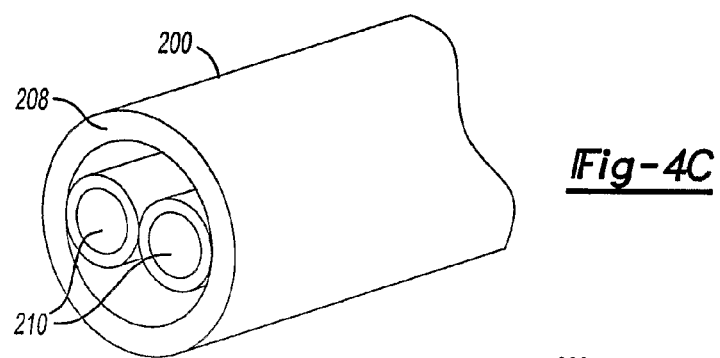
_Fig-4C_
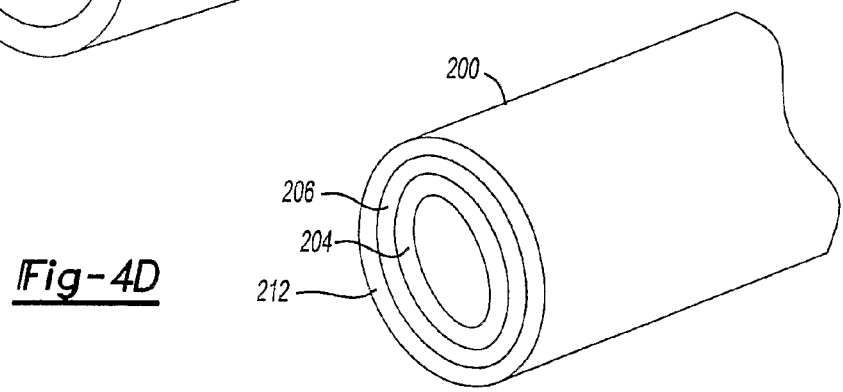
_Fig-4D_

MICROLAYER STRUCTURES AND METHODS

CLAIM OF PRIORITY

The present application claims priority to, and the benefit of the filing date of, U.S. Provisional Application No. 60/621,463 filed on Oct. 22, 2004; 60/717,965 filed on Sep. 16, 2005; 60/718,025 filed on Sep. 16, 2005; and 60/725,399 filed on Oct. 11, 2005, (Express Mail No. EV789808245US), all of which are incorporated by reference.

CROSS-REFERENCE TO RELATED APPLICATIONS

The present application is related to concurrently filed, commonly owned, copending application entitled Apparatus and Process for Manufacturing Shaped Plastic Reinforced Composite Articles Ser. No. 11/577,392; Improved Polyolefinic Materials For Plastic Composites Ser. No. 11/577,394; Plastic Composite Articles and Methods of Making Same Ser. No. 11/577,384; and Improved Composite Pipes and Method of Making Same Ser. No. 11/577,393; all of which are incorporated by reference.

TECHNICAL FIELD

The present invention pertains generally to multiple layer polymeric structures, and particularly to structures and methods employing thermoplastic microlayers.

BACKGROUND OF INVENTION

The past several decades have seen considerable advancement in engineering materials through the development of improved composite materials. Composites allow designers to combine advantageous features of multiple component materials to arrive at a material that typically has one or more different properties than the component materials individually.

One area that has seen particularly rapid advancement is the area of reinforced plastics. For example, it is popular to improve properties of a plastic by incorporating an inorganic reinforcement phase, such as the employment of a fiber that is made of glass, carbon, metal or another inorganic material. In a number of instances, a form is provided that incorporates the inorganic reinforcement material, and is impregnated or otherwise intermixed with a thermoplastic or thermoset plastic matrix. One particular example that has seen increased popularity in recent years is a Glass Mat Thermoplastic (GMT) composite, which ordinarily employs a glass mat reinforcement phase that is impregnated with a thermoplastic such as polypropylene.

One approach to the preparation of a polymeric reinforcement phase for use in a composite is to employ co-extruded multi-layer tapes, having fewer than four layers.

Microlayer structures that employ four or more layers have been disclosed in the art for various purposes, such as in U.S. Pat. Nos. 5,126,880 and 6,837,698, and Dooley, "Viscoelastic Flow Effects in Multilayer Polymer Co-extrusion", Technische Universiteit Eindhoven (2002) (ISBN 90-386-2983-4), incorporated by reference all incorporated by reference. It would be attractive to employ microlayer structures in plastic composites. It would also be attractive to have improved microlayer structures, regardless of their intended application.

SUMMARY OF THE INVENTION

The present invention is directed to embodiments that feature at least 4 stacked layers that each include a polymer, each layer having a thickness less than about 50 microns (an more typically considerably thinner, e.g., possibly even thinner than about 5 microns), and each layer differing relative to its adjoining layer in at least one characteristic selected from composition, degree of crystallization, molecular orientation, molecular weight, melt rate, peak melting temperature, glass transition peak, temperature of crystallization, seal initiation temperature, softening point, molecular weight distribution or any combination thereof.

In one approach, the polymer of at least one or possibly each microlayer of the elongated member will be a propylene-based polymer (e.g., a polypropylene homopolymer, such as an isotactic polypropylene homopolymer). For example, one or more (or even all) of the microlayers may employ polypropylene. It is also possible that the polymer of at least one microlayer includes ethylene. The polymers of at least two adjoining microlayers may include ethylene (e.g., selected from a propylene-ethylene copolymer, a linear low density polyethylene, a high density polyethylene or any mixture thereof). The polymer of each adjoining microlayer may include polyethylene. Typically, the polymers of at least two adjoining microlayers each have a peak melting temperature that differ by at least about 5° C.

An additive or other functional material may be employed, such as a tie-in layer or an intermediate bonding agent layer (the use of which is not limited solely to microlayers taught herein, but may be used in any of the multiple microlayer structures disclosed) between at least two of the stacked microlayers. The materials may also include the above-mentioned non-migratory processing or surface modification agent disposed on an exposed surface of at least one of the microlayers.

Generally, the microlayer articles herein will be made by coextruding a lamellar polymeric body, using suitable equipment such as a microlayer melt splitter or a hemispherical microlayer coextrusion feedblock, having at least 4 layers including at least a first layer that includes a first polymeric material selected from a thermoplastic polymer, a thermoplastic co-polymer, or a combination thereof, and having a thickness less than about 50 microns, and an adjoining second layer that includes a second polymeric material selected from a thermoplastic polymer, a thermoplastic co-polymer, or a combination thereof, and having a thickness less than about 50 microns; and drawing the lamellar polymeric body (in one or a plurality of stages, at one or a plurality of temperatures) to a draw ratio of greater than about 5, more specifically great than about 10, and still more specifically greater than about 18. The materials and processing conditions may be selected so that the viscosities of the individual polymer layers during the step of co-extruding will vary by less than a factor of about 3.

Though illustrated herein by reference to the use of materials disclosed throughout the present specification, e.g., the discussed propylene-ethylene copolymers, the isotactic polypropylene homopolymer, or a combination thereof, the microlayers advances herein are not limited solely to such materials. Various material combinations are possible, such as a first polymeric material that includes a polyolefin and a second polymeric material includes a polyamide; a first polymeric material that includes a polyolefin and a second polymeric material includes a polyester; a first polymeric material that includes a polyamide and a second polymeric material that includes a polyester; or even a first polymeric material that includes one polyester and a second polymeric material that includes another polyester.

The microlayer materials herein may be processed as taught elsewhere herein. For example, they may be consolidated, shaped, or formed. In one approach, an intermediate form that includes a microlayer is subjected to a deforming operation, by which it is optionally heated and is clamped in a manner such that while a force is applied for deforming the intermediate form, the intermediate form is free to move within a predetermined limit. In addition, an intermediate form that includes a microlayer elongated member may be processed by placing it a tool cavity of a tool, and introducing another thermoplastic material into the tool cavity with it (e.g., for overmolding). Microlayer materials may also be employed in the fabrication of composite pipes.

DESCRIPTION OF THE DRAWINGS

FIGS. 4A-4G illustrate pipe structures in accordance with the present teachings.

DETAILED DESCRIPTION

Figure 1A:
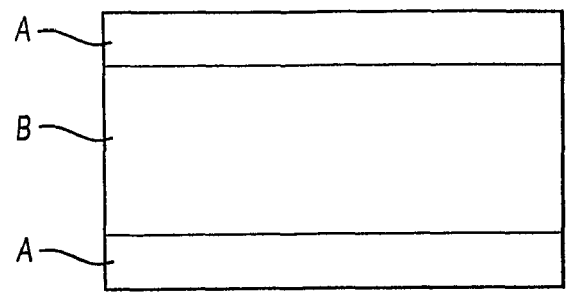
FIG. 1A and FIG. 1B illustrate examples of cross sections of elongated members of the present teachings, it being recognized that microlayer structures commonly will employ plural alternating A and B layers.

Though particularly useful as reinforcement materials for a composite material, the present invention is not limited to such application, as will be seen herein. However, to the extent microlayers are employed as reinforcement materials, in a first particular aspect, the processes of the present invention are directed toward making an intermediate form and include steps of a) providing at least one elongated member including a microlayer structure of a first thermoplastic material and having a surface portion capable of melting prior to the melting of an adjoining or internal portion (such as an internal oriented portion); and b) processing the elongated member into an intermediate form that may include a plurality of repeating structural units that are generally free to move relative to each other, wherein the form is capable of being processed to form a substantially smooth, ruck-free shaped finished article. In general, though not required in every instance elongated members will comprise an oriented polyolefin in at least one of the microlayers, and particularly one that can be processed according to the present teachings with substantial retention of its initial morphology.

In another particular aspect, the processes of the present invention are directed to making an article with the intermediate form. Accordingly, under that aspect, process steps include steps of consolidating and shaping a three-dimensional intermediate form (e.g., simultaneously in a single operation or consecutively in a plurality of operations) that includes at least one elongated member having a microlayer structure and a plurality of repeating structural units of a first thermoplastic material having a surface portion capable of melting prior to an adjoining microlayer portion (such as an adjoining oriented microlayer portion); placing the consolidated and shaped intermediate form into a cavity of a tool; introducing a second thermoplastic material into the tool cavity; and ejecting from the tool cavity a reinforced composite article that includes the consolidated intermediate form and the second thermoplastic material. It is also possible that partial consolidation is performed during the step of introducing the second thermoplastic material into the tool cavity. This illustrative aspect, of course, may be practiced in combination with, or separate from the above first illustrative aspect. Thus, it is possible that a single manufacturer can make the intermediate form and the resulting article, or different manufacturers may make each (e.g., a materials supplier would supply the intermediate form to an article manufacturer). Further, it is possible that the above steps may be practiced in the absence of consolidation of the form prior to introduction of the second thermoplastic material into the tool cavity. Typical articles prepared according to the teachings herein advantageously will exhibit excellent impact and related characteristics (particularly due to the ability, through the use of unique selections or combinations of materials, and/or processing conditions), as a result of a high degree of retained morphology in the elongated member portion of the article.

As indicated various aspects of the present invention are predicated upon the discovery of unique combinations of materials, processing steps, or both, that result in a relatively high degree of retained morphology in the elongated member materials (as compared with its initial morphology upon its initial stretch and prior to processing to form a composite article). In this manner, the teachings herein advantageously allow for the beneficial preservation of properties such as impact properties in the resulting composite articles.

As will be seen, the teachings herein will address novel combinations of materials that find utility in microlayer structures, particularly as respecting elongated members that can be consolidated and optionally shaped and processed (e.g., without limitation, overmolded) for forming a composite article.

Among the specific advancements offered by the present invention is the recognition of specific polyolefinic material combinations that have unique applicability in the composites field. In particular, one aspect of the present invention is premised upon the recognition for use in a microlayer elongated member of a propylene-based (e.g., a propylene-ethylene copolymer, a propylene-α-olefin copolymer, mixtures thereof or otherwise) copolymer that has a melting point that is below an adjoining polypropylene layer, and specifically an oriented polypropylene layer. Upon processing to form articles as taught herein, the resulting materials (especially the oriented polypropylene layer) exhibits a degree of retained morphology from its initial drawn state, heretofore not attainable using conventional materials. Accordingly, aspects of the present invention are premised upon the use of a propylene-ethylene copolymer that has an ethylene content of about 3 to 25 wt. % (e.g., 5 to 15 wt. %), a melting range of about 50 to 135° C., and a flexural modulus of about 8 to about 325 Mpa or higher (e.g., at least about 375 MPa), and a second thermoplastic material that includes a polyolefin, such as a propylene-based polymer. Such propylene-ethylene copolymer may have a Shore A Hardness of from about 40 to 90 (or higher), a molecular weight distribution of about 1.5 to about 4, and a melt flow rate of at least about 0.3 g/10 min, or any combination thereof.

One example of a propylene-based polymer that may be employed generally will be isotactic and relatively stiff. For example, it may be a polypropylene homopolymer that has a 1% secant flexural modulus of greater than about 1000 MPA, (and more specifically greater than about 2000 Mpa (e.g., about 2500 Mpa or higher)), an isotactic pentad/triad ratio of greater than about 70% (e.g., greater than about 85%) or both. Moreover, such a polypropylene typically will have a peak melting temperature of greater than about 160° C. (e.g., greater than about 165° C.), a crystallinity of at least about 30% (more specifically at least about 50% or even 70%) or both.

The teachings herein are also premised upon the recognition that, for use with the above polymers, or with other polymers taught herein, advantageous results are possible by the use of an optional non-migratory process aid or surface modifier agent in an amount less than about 10% by weight of the material of the elongated member. By way of example, the non-migratory process aid or surface modifier agent may include an agent selected from silicones (e.g., a high molecular weight silicone, such as an alkyl siloxane like dimethylsiloxane), polyolefins, halogenated polymers, or any combination thereof.

In regard to novel combinations of materials, the teachings herein identify an unexpected approach to the fabrication of composites by the use therein of a geophysical textile material (e.g., a polyolefin geophysical textile), such as in combination with intermediate forms that include a microlayer. For example, one such method envisions steps of providing an intermediate form that includes a geophysical textile and a microlayer structure, and overmolding the intermediate form with a thermoplastic. Optionally, the above non-migratory process aid or surface modifier agent may be employed.

As will be seen, the present invention has utility in many different applications. One preferred application contemplates applying the teachings herein to the manufacture of a composite pipe. By way of summary, the teachings contemplate a method for making a composite pipe that includes the steps of providing a core pipe; covering the core pipe (e.g., made of a polymer) with an intermediate form that includes at least one winding of a thermoplastic elongated member that includes a microlayer structure, wherein the elongated member comprises a first thermoplastic material and a second thermoplastic material; consolidating the intermediate form; and optionally applying a jacket over at least a portion of the intermediate form and the core pipe for protecting the core pipe with the intermediate form.

The intermediate form typically includes a plurality of elongated member layers, with at least one of the layers including an elongated member stretched to at least about 5× (and possibly as high as 15× or higher). The elongated members may comprise a coextruded microlayer tape and the consolidating step, particularly where a propylene-based polyolefin is employed in an elongated member, includes maintaining the intermediate form at a temperature of at least about 150° C. for at least about one minute, after the core pipe is covered with the intermediate form. A plurality of layers of windings may be employed.

If employed, the protective jacket typically includes a polymer and the jacket has a pressure rating (per ISO 9080) of greater than about PE 80. Resulting pipes will have a hoop stress performance for withstanding a pressure of 7 MPa at 80° C. for up to 250 hours. Any jacket applied, at least one of the thermoplastic materials of the intermediate form, or both may include a non-migratory process aid or surface modifier agent as taught herein. In one approach, at least one of the first thermoplastic material and the second thermoplastic material includes ethylene. In a specific aspect, the elongated member is made from (i) a first thermoplastic material that comprises a propylene-ethylene copolymer, (ii) a second thermoplastic material that comprises an isotactic polypropylene homopolymer (e.g., having a crystallinity of at least about 30%, and an isotactic pentad/triad ratio of greater than about 70%); or a combination of (i) and (ii). A plurality of microlayers may be employed for the elongated member.

In one approach, the step of consolidating the intermediate form occurs prior to application of the jacket over at least a portion of the intermediate form and the core pipe. In another approach, the step of consolidating occurs from heat realized during the step of applying the jacket.

As will be seen, without limitation, aspects of the present invention also pertain to articles produced with the materials described herein, further specific methods of making such articles, methods of using such articles, in addition to characteristics of the materials themselves and their processed forms.

Elongated Members and Intermediate Forms

Turning first to the intermediate forms of the present invention, in general, these forms will include at least one elongated member with a composition that includes at least one thermoplastic material. By "elongated member", it is generally meant a member that has one of its dimensions (e.g., length) that is longer than at least one other dimension (e.g., width, height, thickness, or diameter), particularly, the length of an elongated member here in substantially greater (e.g., by a factor of at least about 10 or higher) than the width or height. Accordingly, elongated members herein could include, but are not necessarily limited to a member selected from fibres, rods, cords, yarns, tapes, filaments, straps or any combination thereof. As can be appreciated from the above, in a number of aspects, films may also be contemplated as within the meaning of "elongated members". Small scale members may also be possible, such as whiskers or platelets. Though "elongated member" is regarded broadly herein, it should be recognized that particularly preferred forms of the elongated member specifically will include one or more of yarns, tapes, fibres and filaments. A highly preferred elongated member is in the form of a tape.

In addition, it should be appreciated that elongated members of the present invention typically will have been processed for achieving an initial morphology, and specifically an initial orientation state (e.g., it is monoaxially stretched, biaxially stretched, or otherwise stretched, such as in accordance with the proportions specified herein). Among the many unique advantages obtainable using the subject matter disclosed herein is the ability upon conclusion of processing, and especially in finished articles, to realize a substantial preservation of the initial morphology within the elongated member. Accordingly, for example, upon processing, molecular orientation of the elongated member is substantially preserved from its initial state (e.g., at least about 50% and more preferably 75% of the initial orientation of the elongated member remains).

The dimensions of the elongated member typically could be such that it enables the member to be handled manually. More particularly, however, the elongated member will be dimensioned so that it is capable of being machine-handled for processing it into the intermediate form. For example, one specific illustration of the present invention envisions an elongated member, such as a yarn, tape, fiber or filament, that has a thickness, width or diameter no larger than about 5 cm, more specifically no larger than about 1 cm, still more specifically no larger than about 0.5 cm, and even more specifically no larger than about 1 mm. For example, one approach is to employ an elongated member such as a yarn, tape, fiber or filament that has a width of less than 5 mm, and a thickness of less than 1 mm and more specifically less than 0.5 mm (e.g., about 0.01 to 0.25 mm). Of course, it is possible that an intermediate form may include a plurality of elongated members, each being of different thickness, width or both. For example, the warp and weft elongated members of a woven form may respectively vary in thickness, width or both. Further, where films are employed as an elongated member herein, they may be substantially larger (e.g., possibly as wide as at least about 5 meters, and at least about 10, 20, or even 40 meters long).

Typical elongated members will be continuous in profile. However, it is possible that at least partially along the length of the elongated members, the members could be fully densified, partially densified (e.g., foamed), perforated, corrugated, twisted, or any combination thereof. The elongated member may have properties or other characteristics that differ along a dimension of the member.

As will be appreciated, the teachings herein are widespread and need not necessarily be confined to the embodiments featured. For example, the present invention teaches a variety of different materials having utility as elongated members, without regard to the particular application of such elongated members. However, especially in the context of teachings of polymeric reinforced composites, one ore more of the elongated members herein are commonly assembled into an intermediate form, such as without limitation a woven, knit or other form in which there are a plurality of repeating structural units (e.g., the warps and wefts employ a plurality of elongated members). However, the repeating units may be as simple as the individual windings of a wound structure (such structure being possible through the use of a single elongated member.

Figure 2A:
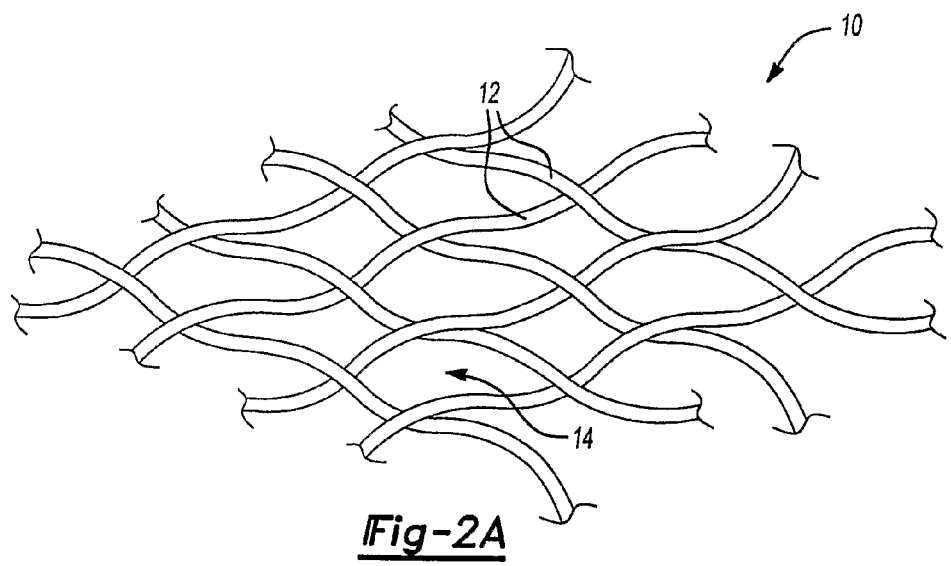
FIG. 2A and FIG. 2B illustrate respectively an example of an unconsolidated and consolidated intermediate form in accordance with the present teachings.
Figure 2B:
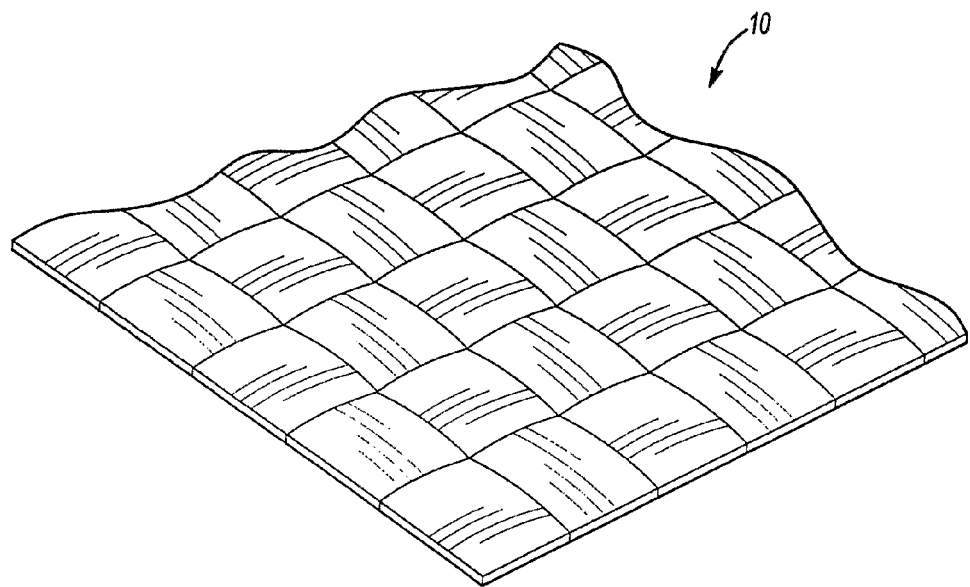

Accordingly, after the formation of the elongated member, it is processed to make an intermediate form, such as one selected from a woven form, a winding form, a knit form, a braided form, a randomly dispersed form or any combination thereof. The form may also be wrapped or otherwise coated or covered. As referenced herein the intermediate form will typically include the plurality of repeating structural units. Examples of these structural units are illustrated in FIG. 2A. For example, an intermediate form 10 might include a plurality of repeating structural units 12 arranged to define a pattern 14, such as a basketweave of FIG. 2A, another plain weave, a twill weave (such as a herringbone, a tweed, a houndstooth, a plaid or other twill), a lace, a satin, or any combination thereof. Examples of particular weaves include weaves that having a pattern warp elongated member running over and then under a weft elongated member in a warp/weft proportion ranging from 1/1 to 14/2 (e.g., 2/1, 2/2, 3/1, or otherwise). Still more particular examples of weaves include, without limitation, a 2/1 twill, a 2/2 twill, a crowfoot satin, a 2/2 basketweave, a 5H satin, a 8-H satin, or otherwise. Thus, as can be seen, individual structural units of the form may be disposed in any of a number of possible configurations relative to each other. For example, as in FIGS. 2A and 2B, overlapping units may be generally perpendicular to each other. However, other angles of weave may also be employed as desired. In general, the weight ratio of warp to weft elongated members will range from about 90:10 to about 40:60, and more preferably about 70:30 to about 45:55 (e.g., about 50:50).

Though illustrative warp and weft ranges are disclosed in the above, it is possible that others may also provide satisfactory results. For example, the average number of warp elongated members per unit area may be the same as the number of weft elongated members in the same area. It is possible that the numbers of each may vary relative to each other. For example, the average number of warp and weft elongated members per unit area may vary by 10% or less (e.g. within a 4 cm$^2$ there may be 18 warp members and 20 weft members). They may vary in larger proportions as well, such as by at least 20%, or even by at least 50% (e.g. within a 4 cm$^2$ area there may be 10 warp members and 20 weft members).

It is also possible that as between the warp and weft elongated members, the thickness, width, or both of the elongated members may be substantially the same, such that they vary by no more than about 10%. It is possible, however, that as between the warp and weft elongated members, the thickness, width, or both of the elongated members may vary by 20% or more. As will be discussed in further detail momentarily, it should also be appreciated from the above that the intermediate form may include a plurality of layers, with at least two of the layers having a different weave characteristic relative to the other layers.

Monolithic Elongated Members and Geophysical Textiles

As the following discussion illustrates, elongated members useful in accordance with the present teachings (such as in a layer of an intermediate form that is combined with a layer employing a microlayer structure) may be of a substantially homogenous construction, i.e., a monolithic structure where the composition is the same throughout. They may also have a variation in the composition across the width, thickness or diameter, such as is achievable through a multiple-layer construction. As to the former, though windings of a monolithic elongated member structure are possible, more commonly, monolithic elongated members will be in a woven form, as a material known generally as a geophysical textile.

Indeed, among the many unique features of the present invention is the ability to make effective use of the above-referenced monolithic materials, such as the mentioned geophysical textiles. These materials currently commonly find many civil engineering applications (although the present teachings are not so continued), such as one or more of erosion control/soil retention, silt fence, landscaping, reinforcement, separation (e.g., for paving), drainage and other applications. Quite often, geophysical textiles exhibit a relatively high bi-directional strength and stiffness and comprise woven fibers that may not be consolidated and may thus exhibit some amount of permeability, permitivity or both. Properties of geophysical textiles can vary over a wide range. By way of example, it may be possible that the geophysical textiles will exhibit a grab tensile strength (per ASTM D4632) of at least about 0.3 kN, and more specifically ranging from about 0.5 to about 3 kN, and a grab tensile strength elongation (per ASTM D4632) of at least 10%, e.g., about 15%, with levels of 50% or higher also possible. The geophysical textiles will exhibit a Mullen burst strength (per ASTM D3786) of at least about 1000 kPa, and more specifically from about 2000 to 10,000 kPa (e.g., about 3000 to 7000 kPa), and a puncture strength (per ASTM D4833) of at least 0.20 kN, and more specifically ranging from about 0.25 kN to about 0.80 kN. Examples of commercially available geophysical textiles include polypropylene fabrics, such as those offered under the name Propex® (from Propex Fabrics (Georgia)), as well as geophysical textiles offered by Don & Low under the designation LOTREK, by Mirafi (Ten Cate Nicolon) under the designation GEOLON, and other vendors such as US Fabrics, Inc. and LINQ Industrial Fabrics, Inc.

It will be appreciated that geophysical textiles useful in accordance with the present invention may be fabricated from one or more thermoplastic (e.g., a polyester, a polyolefin, or a combination thereof). Of course, the various individual thermoplastic materials disclosed herein can be formed into a geophysical textile. Geophysical textiles commonly (but need not necessarily) include an oriented portion, and typically articles made herein using a woven geophysical textile will include elongated members that have been processed (e.g., stretched) to include an oriented portion, especially a portion that exhibits substantially preservation of its initial morphology. Though one preferred approach contemplates the use of woven geophysical textiles, it is also possible that the geophysical textiles will be nonwoven (e.g., prepared from staple fibers, continuous filaments or both that are typically needle-punched and heat-bonded). Geophysical textiles typically will be prepared from slit films or extruded monofilaments or the like, and thus, commonly will been processed to include an oriented portion. But it is possible that the textile may incorporate one or more multi-filaments. In yet another aspect of the invention, the geophysical textile may include one or more naturally occurring fiber, such as jute, hemp, or the like.

As will be appreciated from the discussions herein, a geophysical textile material may be employed in various of the embodiments disclosed herein. By way of example, without limitation, a geophysical textile may be overmolded in a structure that includes a microlayer in accordance with the teachings herein; combined in a multiple layer intermediate form with one or more other geophysical textiles, multiple layer woven or wound intermediate form or both; may employ one or a combination of the homo-polymers or copolymers herein; or any combination thereof.

Multiple Layer Elongated Members

Turning now to a more detailed discussion of other aspects of elongated members, the technology disclosed herein is premised upon the employment of multi-layer elongated member. In particular, a multi-layer elongated member commonly will employ at least a first surface portion and a second portion that adjoins the first portion, wherein the first portion and the second portion differ in composition, polydispersity, morphology, melt rate, or any combination thereof. For example, one specific approach envisions at least one elongated member of a first thermoplastic material and having a surface portion capable of melting prior to an adjoining portion, such as oriented adjoining portion. As will be discussed, at least one of the layers will be a microlayer.

The present teachings advantageously afford the ability to make elongated members such as a tape a plurality (e.g., at least 4) of adjoining layers of polymers (e.g., polymer A and polymer B—referred to herein as an A-B component structure, such as A-B, A-B-A, A-B-C, A-B-C-D, etc. or any combination thereof, such as A-B-D, A-B-C-B-D, A-C-B, or otherwise, where the C and D designations denote without limitation yet additional potential polymers, for example, as may be encountered with the microlayer teachings presented herein). When different polymers are employed within an elongated member they may each be of the same composition or a different composition. They may be from the same general family of polymers (e.g., polyolefins), or different. They may be from the same specific type of polymer within a family (e.g., polypropylene), but vary relative to each other with respect to some characteristic such as weight average molecular weight, polydispersity, morphology; melt rate or other melt characteristic, or any combination thereof. It should be appreciated that one or more of the components (e.g., A, B, C, D or some other component) need not necessarily be a polymer, but may be an additive, or other functional material.

Figure 1B:
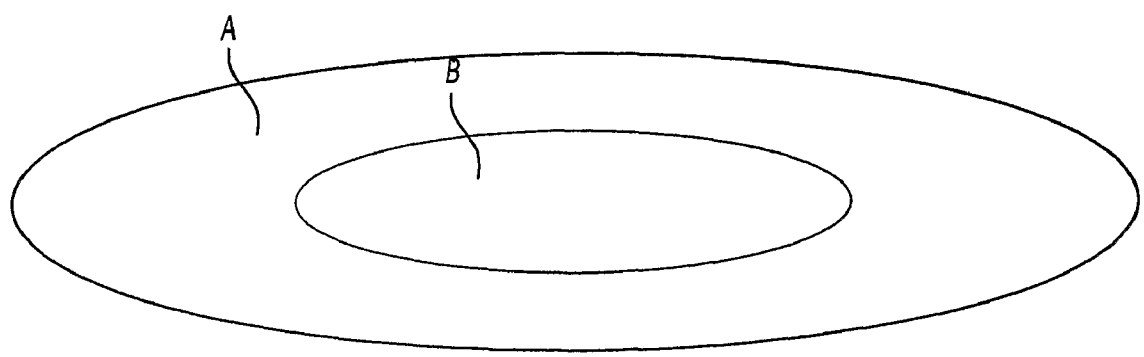

Turning first to multiple layer embodiments, such as may be encountered in a material that includes components A and B (e.g., microlayer structure that includes plural alternating A and B layers) typically, the A and B components will be arranged in layered relation relative to each other (e.g., FIG. 1A, side-by-side (such as a bi-component material)) or in a core/sheath relation (e.g., FIG. 1B). Though shown in its most basic structure, it will be appreciated that microlayer structures may include additional layers relative to the despictions of FIGS. 1A and 1B. Structures that combine a microlayer with layers that are not microlayers are also contemplated. The B component may be covered only partially, such as by exposing at least one side (see, e.g., FIG. 1A showing two exposed sides), or completely about its periphery by the A component (as in FIG. 1B). The layered embodiment of FIG. 1A, it will be appreciated, can also include rounded edges or surfaces. Ordinarily the component B will be located within an interior portion of the elongated member, and will be a higher melting point material than the component A. Thus, the structure and material of the elongated member will permit the component A to melt before the component B, and will enable the substantial retention of morphology in at least the component B. As will be appreciated, the relative amounts of component A to component B may vary. In some applications, for example, it is possible that a relatively small outer layer (e.g., an A layer of a multiple layer combination having plural alternating A and B layers) is applied to a relatively large interior layer (the B layer). Other applications may employ a larger outer layer. For example, for an A-B-A plural alternating layer microlayer combination the relative volumes of each of A and B may range from about 1:1:1 to 1:35:1, more specifically about 1:10:1 to 1:25:1, and still more specifically about 1:15:1 to 1:20:1 (e.g., 1:17:1). An A-B core-sheath structure may use similar proportions, but omitting one of the corresponding amounts for one of the outer layers. For example, instead of 1:1:1, the proportion would become 1:1.

As introduced in the above, an elongated member (e.g. a coextruded tape) made with these components (e.g., an A-B-A multiple layer elongated member or a microlayer structure that includes plural alternating A and B layers) preferably comprises about 1 to 20 wt % of component A and about 80 to 99 wt % of component B. Though such relative proportions will be typical of a large number of various elongated members in accordance with the present teachings, it should not be considered limiting. For example, for some applications, the employment of larger proportions of component A relative to the component B in an elongated member is also possible and good results are obtainable in accordance with the teachings herein. For example, it is contemplated that the amount of the component B (e.g., a polymer including polypropylene, such as a homopolymer of polypropylene) may be lower than about 50% by weight of the overall weight (e.g., less than about 45% by weight of the overall weight, or possibly about 10 to about 45% by weight of the overall weight, or even more specifically about 20 to about 40% by weight of the overall weight).

In general, where an elongated member includes at least a component A and component B, typically, the melting points (which may occur over a range of temperatures) of the components A and B will differ, with the melting point (namely, the peak melting temperature for materials that have a melting range) of the component A being below the melting point of component B. In addition, the higher melting point material typically will be at least partially oriented (e.g., mono-axially or bi-axially). The relative melting points may differ by as small as about 5° C., but will more typically vary by at least about 10° C., more preferably at least about 20° C., and in one specific example may vary by as much as at least about 25° C. (e.g., about 30° C.) or higher. For example, without limitation, component A may have a melting point of about 130° C. and component B may have a melting point of above about 160° C. As a result of the spread of the temperatures for the melting point, what results is that a processing window is realized within which the component A is able to flow and fuse with adjoining material, for achieving consolidation upon cooling. In the meantime, by maintaining the processing temperature of the component B at below its melting point, the risk can be reduced that the component B will suffer significant degradation to its initial morphology, and compromise to its properties, such as the overall high flexural modulus of the elongated member. In turn, additional benefits can be realized by the ability upon conclusion of processing, and especially in finished articles, to realize a substantial preservation of the initial morphology within the elongated member. In addition to the ability to retain morphology, consolidating near the lower end of the temperature range has the additional benefit that the elongated component will be generally less prone to relax or shrink.

As discussed above, it is seen that the reference melt characteristic temperatures selected for discussion are the melting points (such as obtainable by differential scanning calorimetry according to ISO 11357-3). It should be realized that for some materials, the melting point may not be sharply defined (for example, because it occurs over a range of temperatures). Accordingly, for such materials, the skilled artisan with appreciate that reference to a melting point generally refers to the peak melting temperature. Moreover, in some instances, it may be more convenient to employ an alternative similar approach by the substitution of another related measure of the melt characteristic of the material, glass transition temperature or the polymeric softening temperature, the peak temperature of crystallization (e.g., as described in WO2004/033509 (incorporated by reference)), or even the seal initiation temperature (e.g., as described in *Isothermal Crystallization Kinetics and Morphology of Polypropylenes and Propylene/Ethylene (P/E) Copolymers*; by C. H. Stephens, B. C. Poon, A. R. Kamdar, S. Chum, P. Ansems, K. Swogger, A. Hiltner and E. Baer. (Presented at the SPE ANTEC Conference in Chicago, Ill., in May 2004), incorporated by reference), for the respective components.

Effectively, therefore, the desired spread in relevant melt characteristic temperature of the respective components A and B (e.g., a difference of about 5, 10, 20, 25, or 30° C. or more in such melt characteristic temperature of the polymer) is selected generally so that fusion of the component A can occur without reduction to the enhanced mechanical properties that component B possesses relative to component A in their initial solid states.

One potential benefit of a multiple layer structure is the ability to prepare the elongated member to provide differences in characteristics within respective portions of the elongated member, so that the elongated member can be precisely tailored for a particular application, for a particular set of processing conditions, or a combination thereof. As will be seen from a review of the discussion herein, the manner of achieving an advantageous multiple layer structure may vary depending upon the attendant results sought, and a variety of techniques may be employed for realizing a multiple layer structure. For example, one or more of the portions may be coated, laminated, adhered, surface treated (e.g., atmospherically treated (e.g., oxidized or the like), a corona discharge, or other plasma treatment), flame sprayed, ionized, irradiated, powder coated, hot melt applied, or otherwise joined onto another portion. In another approach, the different portions may be subjected to different heat treatments, different strain treatments or other processing conditions. In still another, different portions are coextruded together. Combinations of the above approaches may also be employed.

In more detail, the elongated members of the present invention will be derived from a film (which film may be un-oriented, but more typically will be monoaxially oriented, biaxially oriented or otherwise). For example, it is possible that the elongated members (and particularly elongated members selected from at least one of the yarns, tapes, fibres or filaments) could be made by subjecting a molten polymer (e.g., at a melt temperature of the polymer, such as about 200 to 240° C. for various polyolefins or other thermoplastics) to a blown film process (e.g., an air quenched blown film process, such as discussed in WO2005035598, incorporated by reference), by a cast film or sheet (e.g., quenching an extruded molten polymer using a chilled roller), or by film or sheet extrusion (e.g., such as through a water-bath). Combinations of these approaches may also be employed. The film or sheet can then be slit into predetermined widths, using a suitable cutting operation such as sonic slitting, hot knife slitting, a combination thereof or otherwise. Slit films can then be processed into the desired denier (e.g., from about 1000 to about 20,000, e.g., possibly greater than about 13,500) and weight (e.g., a weight of at least about 7 g/denier and possibly at least as high as about 9 g/denier or higher, and even more specifically higher than about 10 g/denier) through a heating phase (such as by use of a hot table) or a stretching operation (optionally employing a stretching oven for elevated temperature stretching). For some embodiments, slit films may have a tex characteristic (the weight of length of about 10 km tape) of from about 60 to 300. Slit films can also be fibrillated and wound onto bobbins for later use in final products. The entire process as described typically will be a continuous process, but need not be.

By way of further particular example, another possible approach for forming an elongated member (and particularly an elongated member selected from yarn, tape, fibre or filament) may be to subject a molten polymer (e.g., at a melt temperature of 90 to 230° C.) to a step of extrusion (e.g. following which it passed through a water bath at a temperature of 20 to 40° C.) with a suitable die (optionally with a tapered opening) such as a sheet die (e.g. a Collin Teachline extruder) to form a cast sheet of up to about 10 mm thickness (more typically it is about 1 mm thick). The sheet is slit into widths of about 1 to 20 mm, more particularly about 2 to 10 mm (e.g., about 5 mm) and stretched between goddets in one or more heated ovens to a draw ratio of about 2 to 10 (e.g., about 5) or higher at about 50 to 70° C. (e.g., 60° C.). The resulting yarn, tape, fibre or filament may then be further stretched at one or more elevated temperatures (e.g., greater than about 120° C., such as at a temperature of about 140 to 200° C. (e.g., about 170° C.)) at one or more additional draw ratios of at least about 2 to 8 (e.g., about 3.5), which results in a desired thickness (e.g., about 0.3 to 2 mm, more specifically about 0.05 to 0.3 mm (particularly when the cast sheet is about 1 mm thick) or possibly larger or smaller). It may also be possible to include one or more stretching steps at a temperature below the melting point of the stretched polymer. One possible stretching operation involves stretching a material that includes a polypropylene homopolymer at a temperature of about 170° C. to a draw ratio of at least 5, more specifically at least 10, and still more specifically at least 15.

In another approach, such as one for monoaxially-oriented processing, a flat or round profile is extruded and then oriented according to techniques for forming a monoaxially-oriented elongated member to obtain the desired tenacity and denier. Then, the elongated member may be wound onto a bobbin. It will be appreciated that the above processes are suitable for adaptation for forming an elongated member that includes two polymers, such as by coextrusion of the two polymers to form a tape or filament.

In the course of manufacture of a multiple-layer elongated member, it also is desirable to substantially approximate the rheology of the respective layers to help avoid build-up of undesirable shear stresses or other consequences as the material is passed through any feedblock and die assembly.

As can be gleaned from the above, as the present teachings relate to stretching, the skilled artisan will appreciate that many alternative approaches to stretching are possible. It is common in many such instances that a film or sheet is subjected to one or more stretching (e.g., uniaxial, biaxial or otherwise) steps, such as for forming a yarn, tape, fibre or filament. Stretching can be performed in a single-stage operation or a plural stage operation (e.g., a dual-stage process). Stretching typically will be done at an elevated temperature (e.g., particularly for polyolefins, greater than about 60° C., and even more typically greater than about 100° C., such as between about 100 to about 200° C., more specifically up to about 190° C. (e.g., about 120 to 180° C., and even more specifically for polypropylenes about 140 to about 190° C., such as about 150° C. to 170°), it being recognized that temperature conditions for other materials such as polyesters may be other than as set forth). Considered another way, for a system that includes higher and lower melting point components, the stretching typically will occur at a temperature that is above the melting temperature of the lower melting point component, and within about 10° C. of the peak melting temperature of the higher melting point component. The amount of film stretch per stage (as compared with its isotropic melt state) can be selected as desired, ranging for example from about 2× to about 20× or higher (e.g., about 4× to 10×, about 8× to 15× or possibly about 15× to 18×, or even about 25× to 40×). Further, the stretching can be accomplished by a single stage (so that one stretch accomplishes the entirety of the stretching), or plural stage operation (e.g., a plurality of consecutive stretches). Higher or lower stretch amounts may be possible. Further, though disclosed particularly for single stage stretches, a plurality of sequential steps may also be employed for accomplishing the desired stretch amount. During each stage the temperature of the film can be kept constant or varied over a range of temperatures. Stretching amounts herein are disclosed with reference to a comparison of the resulting elongated member with the film formed from an isotropic melt. Additional aspects of elongated member formation will be addressed more specifically in the discussion herein.

Desirably, however, upon completion of stretching, the elongated member (especially elongated members that are selected from a yarn, tape, fibre or filament) will exhibit an initial morphology, including an orientation (typically a monoaxial orientation, but potentially also having biaxial or other orientation components). Attendant therewith typically will be an increase in the strength and rigidity of the material as compared with its unstretched or relaxed state. For example, upon stretching, elongated members (especially those that include higher and lower melting point components (such as an alternating plural layer A-B type structure), in accordance with the present invention frequently will exhibit a modulus of elasticity of at least about 13 GPa, and more specifically at least about 18 GPa, as measured by ASTM D-638 and a tensile strength of at least about 150 MPa, and more typically at least about 300 MPa, as measured by the following ASTM test method D-638. As will be appreciated, the substantial preservation of morphology (and the attendant attractive properties) is among the benefits obtainable from the present teachings. Of course, as will also be gleaned from the discussions herein, the above properties are not mandatory. It is also common for many of the materials taught herein (e.g., the geophysical textiles and others) to have a modulus of about 5 to 12 GPa.

Materials for Elongated Members

In the discussion that follows, it will be seen that particular advances in the present technology can be achieved through one or a combination of the selection of the particular polymer constituents for the respective layers, the size of the respective layers, the manner of making individual layers, or the manner of assembling the respective layers. In one particular aspect, it will be shown herein a recognition that recent technological advances in the field of polymers have significant applications in the field of polymer composites. For example, from the discussions herein, it will be seen that the present invention makes advantageous and unexpected use of thermal and mechanical properties of various conventional polymers as well as recently discovered polymers.

Examples of specific polymers that can be employed in accordance with the present teachings include one or more polyolefins such as thermoplastic olefins, poly($\alpha$)olefins, ethylene-based polymers, propylene-based polymers, or any combination thereof (whether in the form of one or more of a copolymer, a blend or an alloy). In general, for multiple-layer structures, a combination of materials will be employed wherein a lower melting point polymer is coextruded with a higher melting point polymer to form the layers. Though either layer may be amorphous or at least partially crystalline, specific examples taught herein have the higher melting point polymer layers being of a relatively high degree of crystallinity (e.g., at least 30%, and more typically at least 50%, or even 70%). As discussed throughout, one of the advantages that are possible following the teachings herein is that, even subsequent to processing of the materials for fabricating a composite article, the material of at least the higher melting point layer exhibits a substantial preservation of its morphology, such as by retaining a relatively high degree of crystallinity (e.g., at least 30%, and more typically at least 50%, or even 70%) even after a step of consolidation.

Ethylene-based polymers include but are not limited to ethylene homopolymer or interpolymers of ethylene with at least one $C_3$-$C_{20}$ $\alpha$-olefins, and may be referred to as ultra high density polyethylene (UHDPE), ultra high molecular weight polyethylene (UHMWPE), high density polyethylene (HDPE), medium density polyethylene (MDPE), low density polyethylene (LDPE), linear low density polyethylene (LLDPE), very low density polyethylene (VLDPE), ultra-low density polyethylene (ULDPE), or substantially linear ethylene polymer (SLEP). Ethylene-based polymers may be made via one or more various processes, including but not limited to high pressure, solution, slurry, or gas phase reactions, using one or more various catalyst systems such as chromium (Cr), Ziegler-Natta (Z-N), metallocene, constrained geometry (CG), or other advanced, non-metallocene, complexes. For use as a lower melting point component A in an A-B structure, it is desirable to employ a copolymer of a polypropylene having one of the above ethylene-based polymers, or possibly another $\alpha$-olefin (e.g., butene, or the like). Other possible materials include blends of polypropylene copolymers with (co)polyethylene (e.g., heterophasic polypropylenes).

Propylene-based polymers include but are not limited to propylene homopolymer or interpolymers of propylene with at least one of $C_2$ or $C_4$-$C_{20}$ $\alpha$-olefins, and may be referred to as homopolymer polypropylene (hPP), random copolymer polypropylene (RCP), high crystalline polypropylene (HCPP), rubber-modified polypropylene (generally a hPP or RCP matrix with a disperse "rubber" phase), also referred to as impact or block copolymers (ICP), or propylene-ethylene copolymers. Propylene-based polymers may be made via various processes, including but not limited to solution, slurry, or gas phase, using various catalyst systems such as Ziegler-Natta (Z-N), metallocene, or other advanced, non-metallocene complexes. Propylene-based polymers may be isotactic, syndiotactic or atactic, but preferably are isotactic.

Examples, of particularly preferred polyolefins for the lower melting component (e.g., component A in an plural alternating A-B layered elongated member) include propylene-ethylene copolymers (which may be rubber-modified); more preferably with narrow molecular weight distribution such as those available from Dow Chemical under the designation VERSIFY, or ExxonMobil under the designation VISTAMAXX, or a combination thereof. Even more specific examples of polymers that may be employed in accordance with the present teachings include those disclosed in WO 03/040201 A1, published US Application No. 2003-0204017, and U.S. Pat. No. 6,525,157, all of which are incorporated by reference. For example, the material may be a propylene-ethylene copolymer in the substantial absence of dienes. Another potential candidate as one or more layers of microlayer materials described herein is a polypropylene homopolymer made with a metallocene catalyst such that it exhibits a relatively low melting point. Commercial examples of such materials include ACHIEVE (available from ExxonMobil), and METOCENE (available from Basell); see also Kunzer and Wieners, Kunstoffe Plast Europe 86 (May 1996) 5, pp. 666-670, incorporated by reference. An example of one commercially available polyethylene material that may be used herein is that available under the trade designation AFFINITY, from The Dow Chemical Company.

In one approach, the copolymers may be made in a metallocene catalyst process that employs a single reactor, in steady state. In another approach the copolymer may be made using a nonmetallocene metal-ligand complex (e.g., metal-centered, heteroaryl ligand catalyst in the presence of an activating co-catalyst such as alumoxane). Of course other catalyst approaches may be employed, such as discussed previously. In one embodiment, the copolymer includes from about 5% to 25% by weight ethylene-derived units, and from about 75% to 95% by weight propylene-derived units, the percentages by weight based on the total weight of propylene- and ethylene-derived units. As little as about 3% by weight (or less) of ethylene-derived units is also possible.

A preferred propylene-ethylene copolymer for use herein (whether alone or in combination with another polymer, such as a polypropylene homopolymer or random polypropylene, and whether used in an outer layer (e.g., a lower melting point layer) or an inner layer (e.g., a higher melting point layer)) preferably is a specialty propylene-ethylene copolymer and thus has a combination of two, three or more (e.g., a combination of all) of the following characteristics: a) a Molecular Weight Distribution (MWD) of about 1.5 to about 4 (e.g., 2 to 3), b) a Melt Flow Rate (at 230° C.) (MFR) (per ASTM D1238) of at least about 0.3 (e.g., about 0.5 g/10 min), and more specifically about 0.3 to about 50 g/10 min (e.g., 2 to 25 g/10 min), c) a density (per ASTM D792) of about 0.80 to about 0.95 g/cc, and more particularly about 0.85 to 0.91 (e.g. 0.858 to 0.888 g/cc); d) a comonomer content of about 3 to 25 wt % (e.g., 5 to 15 wt %); e) a Glass Transition Temperature (Tg) of about 0 to about −50° C. (e.g., −15 to −35° C.); f) a Melting Range from about 40 to about 160° C. (e.g., 50 to 135° C.); g) a Shore A Hardness from about 25 to about 100, and more particularly about 40 to about 90 (e.g., 50 to 75); and h) a flexural modulus (per ISO 178) of about 5 to 1000 MPa, or more particularly from 8 to 325 MPa (e.g., 10 to 280 MPa), or higher (e.g., in excess of 2000 MPa). By way of example, without limitation, such material may have a flexural modulus of about 8 to about 325 MPa (e.g., about 10 to 280 MPa), an ethylene content of about 3 to 25 wt %, and optionally a peak melting peak below about 135° C., a Shore A Hardness from about 25 to about 100, and more particularly about 40 to about 90 (e.g., 50 to 75); or a combination of both. A commercially available example of one such copolymer is available from the Dow Chemical Company under the name VERSIFY. In one particular example, the above characteristics are observed in the elongated member and thereafter in a resulting composite article prepared according to the teachings herein.

The material preferably commonly may be one or more of a random copolymer, a hetero-phasic copolymer with a random matrix, a clarified copolymer (e.g., clarified using a nucleator/clarifier taught herein) or an isotactic copolymer.

In general, particularly for elongated members that have an A-B component structure not only will component B include a polymer that has a higher melting point than that in component A, typically the component B material will be an oriented material that exhibits substantially retained morphology after processing greater stiffness, toughness, and possibly even tensile strength than the material of component A. Thus, it is common that the component B will be a major contributor to the overall mechanical properties of the elongated member.

In one particular illustrative embodiment, the component B will include as a major portion, a relatively high stiffness material, and particularly a polyolefinic polymer. In one aspect, it is particularly desired that the component B will include or even consist essentially of an oriented polypropylene. Typically the molecular weight distribution of the component B may be narrow, medium or broad. For various applications, the component B that is employed may be characterized also as a multi-modal nucleated material. One particularly preferred class of polymers for the higher melting point material (e.g., the component B) will have a flexural modulus per ASTM D 790, ISO 178 of greater than about 1000 MPa (e.g., greater than about 1200 MPa such as about 1500 MPa) or higher. Specific examples include a homopolymer polypropylene (hPP), a random copolymer polypropylene (RCPP) or a combination thereof. Examples of commercially available materials include those available from The Dow Chemical Company (e.g., offered under the designation INSPIRE), ExxonMobil (e.g., offered under the designations PP9122, PP9852E1, PP2252, PP4712E1, PP4772, PP4792E1 or the like), Basell (e.g., offered under the designation ADSTIF, METOCENE, or MOPLEN), or Borealis (BORMOD). Another material that may find suitability in the A or B components of the present teachings is ADFLEX (e.g., Z104), available from Basell.

One particular example of an attractive polypropylene for use in the present includes or more specifically consists essentially of an isotactic polypropylene homopolymer (e.g., as prepared and analyzed in accordance with the teachings of WO 2004/033509 and US 20040122196, hereby incorporated by reference; see Appendix herein for additional teachings of materials characterizations analyses). Accordingly, for use in the component B, one example of a specific polypropylene is characterized by a combination of two, three, four, five, six or more (e.g., a combination of all) of the following characteristics: a) a molecular weight distribution $(M_w/M_n)$ of less than about 5.5, as measured by gel-permeation chromatography according to the teachings published in WO 2004/033509 and US Patent Application No. 20040122196 (see Appendix), b) a melt flow rate (at 230° C.)

(per ASTM D1238) of less than about 25 g/10 min, more preferably less than about 10 g/10 min, and more preferably less than about 7 g/10 min (e.g., less than about 5 g/10 min), c) a 1% secant flexural modulus (per ASTM D790-00) of greater than about 2000 MPa (e.g., greater than about 300,000 psi), d) less than about 2% (e.g., less than about 1%) xylene solubles, as measured according to the teachings published in WO 20041033509 and US Patent Application No. 20040122196 (see also, Appendix herein), e) a haze (per ASTM D1003) of less than about 25%, f) a crystallinity of at least about 30%, more specifically at least about 50%, and still more particularly greater than about 70%, as measured by differential scanning calorimetry according to the teachings published in WO 2004/033509 and US Patent Application No. 20040122196 (see also, Appendix herein), g) an isotactic pentad/triad ratio of greater than about 70%, more preferably greater than about 85% and still more preferably greater than about 95%, and even still more preferably greater than about 99%, using nuclear magnetic resonance (NMR) according to the teachings published in WO 2004/033509 and US Patent Application No. 20040122196 (see also, Appendix herein); and h) a crystallization temperature (e.g., as measured according to the teachings of WO2004/033509 and US Patent Application No. 20040122196 (see also, Appendix herein)) of greater than 133° C. In one illustrative example, it is possible that the pentad isotacticity is at least 96%, more preferably at least 97%, and most preferably at least 98%. Typically, the polypropylene homopolymer will exhibit a peak melting point of at least 160° C. (e.g., at least 165° C. or even 170° C.). By way of example, the polypropylene homopolymer will exhibit a peak melting point of at least 160° C. (e.g., at least 165° C. or even 170° C.), and a crystallinity of at least about 30%, more specifically at least about 50%, and still more particularly greater than about 70%, an isotactic pentad/triad ratio of greater than about 70%, more preferably greater than about 85% and still more preferably greater than about 95%, and even still more preferably greater than about 99%, or both such isotacticity and crystallinity. In a particular example, the polypropylene homopolymer further will exhibit a 1% secant flexural modulus (per ASTM D790-00) of greater than about 2000 MPa In one particular example, the above characteristics are observed in the elongated member and thereafter in a resulting composite article prepared according to the teachings herein. For example, it is possible that the material of the component B actually exhibits an increase in peak melting point in a resulting consolidated composite article (e.g., by as much as 3, 5 or even 8° C.) as compared with its peak melting point prior to consolidation.

For example, one specific polypropylene is characterized by an $M_w/M_n$ of less than about 7, a melt flow rate of less than about 7 g/10 min, a 1% secant flexural modulus of greater than about 2000 MPa and less than 2% by weight xylene solubles. An example of such polypropylene is discussed in US2004/0122196 entitled "Highly crystalline polypropylene with low xylene solubles" and WO2004/033509 entitled "Highly crystalline polypropylene with low xylene solubles", both incorporated by reference where techniques for determination of the above characteristics are also taught.

It is also recognized herein that additional advantageous results may be obtained (e.g., to aid in stretching) by including within the higher melting point layer such as component B (e.g., as a blend, a copolymer, or a combination thereof), an optional minor amount (relative to the component B) of a lower melting point polyolefinic copolymer, such as a propylene-ethylene copolymer (e.g., of the type described above, such as VERSIFY™ copolymer available from The Dow Chemical Company). Such co-polymer preferably has a combination of two, three or more (e.g., a combination of all) of the above-discussed characteristics for a specialty propylene-ethylene copolymer. Without intending to be bound by theory, it is believed that the inclusion within the component B of a lower melting point polyolefinic material functions to help bond the component B layer to the component A layer; it also is believed that the presence of the lower melting point polyolefinic material helps to bond individual fibrils within the component B layer to each other. Likewise it may be possible to vary the characteristics of component A, by including in the component A minor amounts of a material disclosed herein for the component B.

More specifically, as used in the component B of the elongated member, one preferred approach is to employ a polypropylene homopolymer (e.g., one prepared in accordance with the teachings of WO 2004/033509 and US 2004122196, hereby incorporated by reference) in an amount of at least about 70 parts (e.g., 80 to 100 parts) by weight of the component B. If the optional minor amount of the polyolefinic copolymer (e.g., the above discussed propylene-ethylene copolymer) is used, it will be present in an amount of up to about 30 parts (e.g., from about 0 to 10 parts) by weight of the component B.

As mentioned, the higher melting point polymer (e.g., the component B in the illustrative embodiment including an A-B structure) is typically a major contributor to the overall mechanical properties of the elongated member. Though not required in every instance, it is frequently desired that the component B exhibit good stretching characteristics, particularly under elevated temperature (e.g., about 170° C.). Accordingly, it may be possible that the component B exhibit a draw ratio (i.e., the ratio of the initial to final thickness of the body) of at least about 8, more preferably at least about 12, and still more preferably at least about 16 or higher, without rupture or significant compromise to its overall performance. It is also recognized herein that by incorporating an amount of propylene-ethylene copolymer (such as the specialty copolymer as described above) in the component B, such relatively high stretch is possible. From this, it will also be appreciated that, even though the presence of the copolymer initially will reduce the stiffness of the component B, substantial gains in the stiffness of the final stretched material will be realized, because the enhanced stretch capabilities of the material will afford greater opportunity for stiffening to occur during the stretch.

As for examples of particular preferred materials for the higher melting point material (e.g., the material B in the illustrative A-B structure combination), use of a high stiffness, (and in one preferred approach, a highly isotactic) propylene homopolymer. Examples of such homopolymers are described above and in US2004/0122196 entitled "Highly crystalline polypropylene with low xylene solubles" and WO2004/033509 entitled "Highly crystalline polypropylene with low xylene solubles", both incorporated by reference, will permit even higher stretch capabilities (e.g., at least about 10×, more preferably at least about 15×, and still more preferably at least about 20×) in a single step stretching process, thus reducing or even eliminating the need for additional stretching steps, annealing steps that may be employed herein or both. Of course, it will be appreciated that the employment of a highly crystalline polypropylene is desired, it is not mandatory, and good results are also obtainable using polypropylenes that are not highly crystalline (e.g., various conventional polypropylenes derived by Ziegler-Natta catalyst, mini-random polypropylene copolymer, as well as others discussed herein).

The material selected for individual layers of the elongated members herein need not necessarily contain only a copolymer (e.g., a propylene-ethylene copolymer) or a homopolymer (e.g., a polypropylene homopolymer). Rather, it is possible, that copolymers, blends, alloys or other combinations of copolymer and homopolymer may be employed. In this manner, it may be possible to further tailor the characteristics within each individual layer. For example, for a situation in which two components (e.g. component A and component B) are utilized, component A may comprise polypropylene homopolymer and a propylene-ethylene copolymer. For example the polypropylene copolymer may comprise about 0 to 100 parts by weight of component A, while the propylene-ethylene copolymer may comprise from about 5 to 100 parts by weight of the component A. Likewise, an amount of another relatively elastic material (e.g., a polypropylene plastomer or elastomer, a propylene-ethylene copolymer or a combination) might be added to the component B for helping to increase its draw ratio (e.g., in an amount up to about 10 wt. %).

The use of a mini-random (i.e., <2 wt. % $C_2$) propylene-ethylene copolymer in either or both of the A or B components is also contemplated as within the scope of the present teachings. It is also contemplated that the material in either or both of the A or B components will be free of a styrene polymer.

Additives for Use in or with Elongated Member Materials

In one embodiment, the material used for the elongated members may also include a non-migratory process aid or surface modifier agent selected to modify (increase or reduce) the surface friction characteristics, the scratch and abrasion resistance characteristics, or both of the material. Preferably, such surface property agent is present in a relatively small amount, e.g., in an amount less than about 10% by weight of the material (e.g., up to about 4%). Quite typically, the surface property agent selected will be such that it reduces surface friction of the material, increases scratch and abrasion resistance of the component, improves handling of the elongated member during formation of the intermediate form (e.g., improved weaving characteristics) or more preferably a combination of each. Though use of such surface property agent is more likely for an exposed outer layer (e.g., a component A of an A-B structure), it may also be employed elsewhere in the elongated member, such as in a higher melting point material of component B.

Particular examples of classes of materials suitable for use as the non-migratory process aid or surface modifier agent include silicones, polyolefins, halogenated polymers (e.g., fluorinated thermopolymers), or any combination thereof. One particularly preferred agent comprises a high molecular weight silicone, and particularly an ultra-high molecular weight siloxane (e.g., a functionalized or non-functionalized alkyl siloxane, such as a poly(diethyl siloxane) a poly(dimethylsiloxane), or a combination thereof, such as are available commercially as masterbatches from Dow Corning, under the trade designation Dow Corning MB 50-313, MB 50-001, MB50-321 or MB50-021). Other alternatives may be gleaned by reference to WO 01/12715, WO 02/08332, WO 98/13419, all incorporated by reference.

The polyolefins herein optionally may contain a relatively small amount 500 ppm to 2500 ppm (e.g., 750 ppm to 1500 ppm) of a nucleator/clarifier additive. Though the nucleator/clarifier additive advantageously may be employed in the propylene-ethylene copolymers taught herein (and used for example in the component A of an A-B-A multiple layer elongated member), it is particularly desired for use with polypropylene homopolymers, especially those used as component B of an A-B-A multiple layer elongated member. It is further particularly desired for use in drawing processes that involve a single stage draw (it being optional for most applications in which multiple stage draws are employed). In general, the nucleator/clarifier additive is used to increase the stiffness of the films made from the resin and also to increase the crystallization rate of certain of the polymers (e.g., the high crystalline propylene-based polymer) during the manufacture of the air quenched blown film. This nucleator/clarifier additive will also improve the stiffness/clarity balance of the resulting film. Any additive, which simultaneously clarifies and nucleates can be used. Nucleator/clarifier additives such 2 as ADK NA-11 (Methylene-bis(4,6-di-ter-butylphenyl) phosphate sodium salt) and ADK NA-21 (Aluminum hydroxybis[2,4,8,10-tetrakis(1,1-dimethylethyl)-6-hydroxy-12H-dibenzo[d,g][1,3,2]dioxaphoshocin 6-oxidato]) are commercially available from Asahi Denka Kokai and preferably are added to the high crystalline propylene-based polymer of the invention. Millad 3988 (3,4-Dimethylbenzylidine Sorbitol) available from Milliken & Company is another example of a nucleator/clarifier additive that can be utilized in the invention. Sodium benzoate or even sorbitol-based nucleation systems may also be employed in accordance with the present teachings.

The material may also include one or a combination of two or more other ingredients such as other polymers (e.g., a polypropylene, a polyethylene, a fluoroelastomer, any combination thereof, or the like), a filler (e.g., glass, talc, calcium carbonate, or the like), an anti-fibrillation agent (e.g., PE) a nucleation agent, a mold release agent, a flame retardant, an electrically conductive agent, an anti-static agent, a pigment, carbon black, an antioxidant, an impact modifier, a stabilizer (e.g., a UV absorber), or any combination. For example, when these additives are employed they typically will be employed in an amount up to about 15% by weight of the overall component (e.g., about 0 to 10 wt % of the component A, component B or both, and more specifically about 2 to 8 wt %, with individual additives typically used in an amount less than about 1 wt. % of the material, e.g., less than 0.6 wt. %, less than 0.5 wt. %, and even as low as about 0.2 wt. % or lower). The component (e.g., Component A or B) may also include recycled scrap material (e.g., from the manufacture of component A, component B or even from the manufacture of the elongated members of the present invention). Examples of possible additives are taught, without limitation, in EP 0829529A1, incorporated by reference). Examples of commercially available additives include, without limitation, ERUCAMIDE, IRGANOX B215, IRGANOX B225, MISTRON talc, IRGANOX 1010 (or a thioester), CHIMASORB 944, CHIMASORB 119, HOSTASTAT FE2, IRGASTAT and TINUVIN 770. The present teachings contemplate not only the above commercial products, but corresponding product offerings from other manufacturers.

It is also possible to include in the component B (the higher melting point component) of the elongated member material one or more other polymeric components for enhancing its properties. For example, in addition to a polypropylene homopolymer, the high stiffness material may comprise other thermoplastic materials such as polyethylene terephthalate (PET), polyamide, polycarbonate, any of the other thermoplastics described herein, or a mixture thereof. Likewise, an amount of relatively elastic material (e.g., a polypropylene plastomer or elastomer, a propylene-ethylene copolymer or a combination) might be added to the component B for helping to increase its draw capacity.

By way of illustration, one approach to the manufacture of an elongated member involves the formation of a film that is coextruded so that it results in an A-B plural layer alternating structure, wherein the component A is a random copolymer of propylene and about 3 to 15 wt. % ethylene (e.g., about 5 to 15 wt. %) (with a density of about 0.9 g/cm$^3$), and has a melting point of about 50 to about 135° C. (e.g., 100 to 140° C.), and the component B is a polypropylene homopolymer with a peak melting point of about 150 to 170° C. (it being recognized that for some embodiments a melting point in excess of about 170° C. may be possible (e.g., from about 150 to 180° C. or higher)). Accordingly, it is possible that the difference in melting point between component A and B may be as little as about 5 to 9° C., or higher than about 75° C. The relative amounts of the A and B components range from about 1:1 to 25:2, and still more specifically about 2:15 to 1:10 (e.g., about 2:17)). The component A or B may have any suitable weight average molecular weight, such as about 50 to about 400 kg/mol, and more typically about 200 to about 300 kg/mol.

The above is not intended to limit the present teachings. Other examples of extruded tapes or yarns are disclosed, without limitation, in WO 03/008190A1 and WO 2004028803 (both incorporated by reference) (addressing a skin layer (e.g., a component A) that includes a random copolymer including propylene with ethylene or another alpha-olefin; the employment of a metallocene-based statistical polymer is also addressed). EP 0776762B1, incorporated by reference, discloses another example of a possible material for use as an elongated member, pursuant to which a skin layer (e.g., a component A) includes a blend of ethylene copolymer with an amount of high density polyethylene (e.g., about 5 to 45 wt. %). U.S. Pat. Nos. 5,993,711 and 6,045,923 (assigned to Lankhorst Indutech B.V.), both incorporated by reference, also illustrate viable alternatives. According to the former, the profile of the elongated member may include one or more longitudinal ribs and/or longitudinal grooves on one or more surfaces. According to the latter, it is possible that an elongated member may include a central layer (e.g., component B) prepared from a blend of high density polyethylene and one or more other polyolefins, whereby the amount of high density polyethylene is predominant, i.e. more than about 50% by weight. More in particular, the central layer is prepared from a blend of about 50 to 90 wt. % of high density polyethylene (>940 kg/m$^3$) and about 10 to 50 wt. % of (linear) low density polyethylene (<925 kg/m$^3$), very low density polyethylene (<910 kg/m$^3$), or combinations of these products. Additionally an amount of polypropylene may be present to improve the strength of the material. Another possible approach in accordance with the present invention is to form a conductive composite material, wherein the composite includes at least one conductive portion, such as from the presence of a conductive elongated member. The conductive elongated member, for example, may be a coated or uncoated metal wire (e.g., a copper wire). Additional variations can be gleaned from U.S. Pat. No. 6,710,253 (assigned to Lankhorst Indutech B.V.), hereby incorporated by reference.

By way of summary, it is contemplated that in accordance with the present teachings a multiple layer structure may be employed that includes at least two adjoining layers, which differ by their melting point. Thus a higher melting point material (which typically will be oriented) is used in combination with a lower melting point material. The lower melting point material typically will reside on an external surface of the elongated member, so that melting can occur. It is disclosed that the materials employed may be selected from a variety of alternative materials, with one particularly preferred combination including a propylene-ethylene copolymer as a lower melting point material layer, and a higher melting point polypropylene homopolymer layer (specifically one that is oriented). The layers may incorporate other additives as disclosed herein (e.g., polydimethylsiloxane or another suitable non-migratory process aid or surface property agent). It may be possible that amounts (e.g., minor amounts) of the higher melting point polypropylene homopolymer material (e.g., is incorporated into the propylene-ethylene copolymer as taught. Alternatively, or in addition thereto, it is also possible that the amounts (e.g., minor amounts) of the lower melting point propylene-ethylene copolymer material is incorporated into the polypropylene homopolymer as taught. Examples of highly preferred combinations of materials include a lower melting point propylene-ethylene copolymer of a type having characteristics similar to VERSIFY™, available from The Dow Chemical Company, in combination with a highly isotactic polypropylene homopolymer, such as is taught above and in US2004/0122196 and WO2004/033509, both incorporated by reference.

More particularly, as seen from the above the number of combinations of materials for forming a multiple layer structure including an A-B structure (including for microlayers as taught herein) is large. Without intending to be limited by the following, but for sake of summary, the teachings herein contemplate that the lower melting point layer (component A) is selected from ethylene propylene copolymer (without polydimethylsiloxane), ethylene propylene copolymer (with polydimethylsiloxane), heterophasic polypropylene (e.g., ADFLEX), ethylene propylene copolymer (without polydimethylsiloxane) with polypropylene homopolymer, ethylene propylene copolymer (without polydimethylsiloxane) with random copolymer polypropylene (e.g., available from The Dow Chemical Company under the designation R771), or any combination thereof. For the above, an example of a preferred ethylene propylene copolymer is available from The Dow Chemical Company under the designation VERSIFY. Further, without intending to be limited by the following, but for sake of summary, the teachings herein contemplate that the higher melting point layer (component B) is selected from isotactic polypropylene homopolymer, isotactic polypropylene homopolymer with up to about 20 wt % propylene ethylene copolymer (e.g., available from The Dow Chemical Company under the designation VERSIFY), random copolymer polypropylene (e.g., available from The Dow Chemical Company under the designation R771) or any combination thereof. The present teachings contemplate any combination of the component A examples with the component B examples of the present teachings. The materials discussed above, and especially the ones identified in the above summary find particularly attractive in the applications taught later herein, including their use for forming an elongated member for a winding or other intermediate form for use in the reinforcement of pipes.

Microlayers

Turning now with more specificity to aspects of microlayer teachings, by "microlayer" it is meant a layer of relatively fine thickness, e.g., smaller than about 50 microns, more preferably smaller than about 20 microns, more preferably less than about 10 microns in thickness, still more preferably less than about 7 microns in thickness, and even still more preferably less than about 5 microns in thickness. Typically, when employed, microlayers will be fabricated as an assembly of a plurality of stacked, preferably coextruded layers that each include a polymer, co-polymer or mixture thereof. For example, each microlayer may include one or both of the above materials described previously for the layers of components A and B in the illustrative A-B combination, or yet still another component. The number of individual microlayers in a typical elongated member typically will vary from one to four. More commonly, however, the microlayers will comprise at least four or more, and more specifically at least five or more layers of materials, with each layer preferably differing relative to its adjoining layer.

More specifically, by way of example, one specific approach for the manufacture of microlayered polymeric body (e.g., an elongated member) contemplates that at least one first stream of a first molten or softened polymeric material and at least one second stream of a second molten or softened polymeric material are fed into a suitable apparatus (e.g., through a die of the apparatus), where they are brought together by coextruding, such as by using a microlayer melt splitter or a hemispherical microlayer coextrusion feedblock, for encapsulating discrete portions of the first polymeric material with the second polymeric material to form a plurality of ribbon-like layers of the first polymeric material within a matrix of the second polymeric material, thereby forming a lamellar polymeric body. In general, the materials will be selected and processed so that as they are subjected to shearing when passing through a feed tool the viscosities of the different materials will vary by less than a factor of about 3 (e.g., the viscosity of the individual polymer layers under feed conditions will be less than a factor of about 1.5, e.g about 1.25 or even about 1). As a result, the ribbon-like layers may be substantially continuous in a first plane generally parallel to one of the major surfaces of the body and discontinuous in a second plane transverse to the first plane. In addition, it is possible that the layers of the first polymeric material have their major interfaces aligned substantially parallel to the major surfaces of the resulting polymeric body.

Without intending to be bound by theory, in one particular aspect, for the microlayers herein, the present teachings provide approaches for realizing a continuous polymer material in the direction of a draw, which has a confinement that is generally perpendicular to this draw direction (e.g., a polymer is employed that is at least a partially crystalline polymer, and which is confined in a layer or domain that has a lower degree of crystallinity). Due to such confinement, upon solidification, the material generally exhibits a reduced amount of entanglements which, in turn, can be used to increase the drawing capacity of this material, thereby leading to a relatively high stiffness, strength or both in the resulting material.

As discussed, one approach is to employ a structure consistent with that of FIG. 1A that includes a plurality of microlayers that alternate between differing materials of components A and B. For example, this may be expressed as $((A-B)_n-A)$ where n is an integer of 2 or greater. Elongated members where n is 3, 4 or more, 10 or more, 20 or more, 50 or more, 100 or more, 200 or more and 300 or more (e.g., 500 to 1000 layers, or possibly even 1000 to 5000 layers or more) are also contemplated. Microlayer elongated members may be fabricated using any suitable technique, such as layer-multiplying extrusion. One approach is to coextrude a plurality of layers, such as by using a microlayer melt splitter or a hemispherical microlayer coextrusion feedblock. Optionally, extrusion may be onto a chill roll. Lamination techniques may also be used in addition to or in combination with a coextrusion step. In general, the polymers of the layers will be selected so that melt viscosities are approximated to help prevent layer instability or nonuniformity, and so that the polymers used have sufficient interfacial adhesion so that adjoining layers will not delaminate. Additional illustrative teachings are found in U.S. Pat. No. 5,568,316 (also teaching the use of coextrusion devices such as described in U.S. Pat. Nos. 3,773,882 and 3,884,606; 5,269,995; 5,094,793 and 5,094,788, all of the foregoing patents being incorporated by reference). See also, U.S. Pat. Nos. 5,540,978; 5,448,404; 5,339,198; 5,316,703; 5,217,794; 5,126,880; 6,837,698 and EP 0647183B1, all of which are incorporated by reference. See also, thesis of Dooley, "Viscoelastic Flow Effects in Multilayer Polymer Co-extrusion", Technische Universiteit Eindhoven (2002) (ISBN 90-386-2983-4), incorporated by reference; and Rastogi, et al. "Heterogeneity in Polymer Melts from Melting of Polymer Crystals", Nature Materials Vol. 4 (August 2005) (published online on 24 Jul. 2005) incorporated by reference; Jin, et al., "Structure of Polypropylene Crystallized in Confined Nanolayers", PPS-20: Polymer Nanotechnology Symposium (20-24 Jun. 2000) incorporated by reference. It should be recognized, however, that aspects of the invention contemplated that the selection of the materials for use herein does not require any specific degree of reflectance within any layer or combination of layers. Accordingly, it is contemplated that resulting elongated members reflect less than 40% (or even less than 20%) of visible light incident on the body. Likewise, the materials may be free of any coloring agent for giving the body a metallic appearance. They may also be selected without regard to individual optical thicknesses of the constituent layers, or the sum of the optical thicknesses.

Though adjoining layers of the microlayers may be of the same material type, more typically, as with the non-microlayer multiple layer embodiments taught herein, the materials of adjoining layers will differ from each other in at least one characteristic, such as composition, orientation, degree of crystallization, molecular orientation, molecular weight, melt rate, peak melting temperature, glass transition peak, temperature of crystallization, seal initiation temperature, softening point, molecular weight distribution or any combination thereof. For example, different polypropylenes may be combined, different polyethylenes may be combined, different polyethylene terephthalates (PETs) may be combined or the like. Furthermore a polypropylene may be combined with a polyethylene, a PET combined with a polypropylene, or a polyamide combined with a polyethylene or the like. Any of the thermoplastic materials discussed herein may be used in the microlayer elongated member, and the microlayer teachings are not confined to polyolefin polymers. For example, the polyolefinic materials described above for the components A and B can be selected for each of the layers of the microlayered structure.

It is also possible that one or more of the microlayers may include a polymer (or a copolymer including such a polymer) selected from polycarbonate, polyvinylchloride, (meth)acrylonitrile, (meth)acrylate, polyurethane, thermoplastic elastomer, thermoplastic olefin, polyamide (e.g., nylon 6, nylon 6,6 or otherwise), polysulfone, polyester, polyalkylene terephthalate (e.g., poly(ethylene terephthalate), poly(butylene terephthalate), poly(1,4-cyclohexanedimethanol terephthalate) or otherwise), polyalkylene naphthalate (e.g., poly (ethylene naphthalate)), acrylonitrile butadiene styrene, polyarylene sulfide (e.g., polyphenylene sulfide), thermoplastic urethane, polyphenylene ether (PPE), polystyrene, or any combination thereof (whether in the form of a copolymer, a blend or an alloy).

Examples of particular A-B combinations for individual microlayers include, without limitation, polypropylene homopolymer and polypropylene copolymer; polypropylene and propylene-hexane co-polymer HDPE and ethylene copolymer; polyamide (at least partially aromatic or not, and which may include a copolyamide) (e.g., Nylon 6, Nylon 6,6, Nylon 46, Nylon 11, Nylon 12, Nylon 6.6T) and polypropylene; poly(ethylene terephthalate) and another polyester, such as poly(butylene terephthalate), poly(trimethylene terephthalate), or both; poly(ethylene 2,6-naphthalene) or poly(cyclohexanedimethanol terephthalate) with one or more of poly(ethylene terephthalate), poly(butylene terephthalate) or poly(trimethylene terephthalate); polyolefin homopolymers and copolymers (e.g., polybutene and poly 4 methylpentene (e.g., TPX Methylpentene Copolymer from Mitsui).

In addition, optionally (and having application herein for multi-layer structures apart from only microlayers), a tie-in layer or an intermediate bonding agent (e.g., adhesive, primer or otherwise) layer, may be used between adjoining layers of multi-layer elongated member materials, such as between adjoining layers of a microlayer material. In the context of polyolefinic multi-layer materials, typically the tie-in layer or an intermediate bonding agent layer typically includes a polyolefin with a functional reactive group. The use of a tie-in layer or an intermediate bonding agent layer is particularly useful where the compositions of the layers are chemically disparate. For example, when a polyolefin is used as one layer and a polyester or polyamide as the other layer, a layer that includes a polyolefin with a functional reactive group (e.g. a layer including a coupling agent such as maleic anhydride-grafted polypropylene modifiers, available under the designation Polybond® (from Crompton-Uniroyal Chemical, a polyolefin with an epoxy functionality, a polyolefin with a (meth)acrylate (e.g., glycidyl methacrylate) or (meth)acrylic acid functionality, or otherwise) may be used to increase the bonding strength between the layers. It is also possible to employ a tie-in layer or intermediate bonding agent that includes a copolymer that includes a polyethylene, a polypropylene or a mixture thereof. For example, without limitation, one possible approach might be to employ two or more microlayers that are polyolefinic homopolymers (e.g., polypropylene or polyethylene), and to bind such microlayers together with a propylene copolymer, an ethylene copolymer or a mixture thereof. Of course, it will be appreciated that the above-discussed tie-in layer or intermediate bonding agent layer may also be used in elongated members that are not microlayers.

Microlayers are believed to exhibit improved drawing capabilities, which results in higher strength or modulus. By using higher draw ratios in a single or multiple stretch process, higher orientation of the material may be achieved, resulting in improved strength and toughness. The microlayers also exhibit improved impact resistance which is believed to be due to the greater dissipation of impact energy available because of the larger number of individual layers.

The microlayer teachings herein are not confined strictly to the use of microlayers for the formation of elongated members that are only selected from fibres, rods, cords, yarns, tapes, filaments, or straps. Other forms are also possible, particularly films (e.g., oriented films such as biaxially oriented films), such as biaxially oriented polypropylene (BOPP) films. Microlayer elongated members (and other elongated members) may also be used in applications that do not require large drawing capabilities or improved impact resistance such as, stretch cling films, geophysical textiles, raffia, woven fabrics, sacks, artificial grass, carpets, packaging strap, or the like. Of course, microlayer elongated members may be used in intermediate forms like other elongated members described herein, with or without consolidation. Microlayer materials may also be used in combination with other structures such as metals, woods, textiles, combinations thereof or the like.

Exemplary microlayer elongated members comprise at least about 50 wt % (of the overall microlayer structure) of a higher melting point material component B with the balance a lower melting point material component A, in accordance with the foregoing discussion of components A and B, more preferably between at least about 60 wt % of component B, and most preferably between about 70 and 96 wt % of component B with the balance component A. Preferably, component A comprises polypropylene copolymer in an amount of about 0 to 100 wt %, while propylene-ethylene copolymer (e.g. the previously discussed specialty propylene-ethylene copolymer, such as VERSIFY™ copolymer) may comprise about 5 to 100 wt % of component A. Component A may also include a non-migratory processing or surface modification (e.g., friction reduction) agent such as discussed previously (e.g., polydimethylsiloxane, a fluoropolymer such as a fluoroelastomer or the like) in an amount of about 0 to 4 wt % of the component. Component A may also include other compositions as discussed above in amounts of about 0 to 8 wt % of the component.

Component B preferably comprises a high stiffness polypropylene (e.g., random copolymer or in an amount of about 80 to 100 wt % of the component, while also comprising a propylene-ethylene copolymer in an amount up to about 10 wt % of the component. The balance of component B may be made up of other compositions as discussed above in amounts up to about 10 wt % of the component.

To illustrate the above, without limitation, microlayer elongated members having from about 100 to 525 layers or more (alternating between layers consisting essentially of component A, and layers consisting essentially of component B, and optionally including other polymer component layers) and made to include from about 5 to about 25 parts by weight of the above discussed component A, and about 95 to 75 parts by weight of the above discussed component B, which is drawn at a draw ratio of about 18 to 28 at a draw temperature in excess of 150° C. (e.g., 165° C.). More specific examples are included in the following table.

| Wt % component B | Wt % component A | # of layers | Draw ratio at >150° C. |
|---|---|---|---|
| 92 | 8 | 3 | 20 |
| 92 | 8 | 129 | 20 |
| 92 | 8 | 129 | >22 |
| 80 | 20 | 129 | 24 |
| 80 | 20 | 129 | 24 > 26 |
| 80 | 20 | 513 | 24 |

Resulting microlayer structures are capable of exhibiting a tensile modulus (per ASTM D-638 or ISO527) at least about 10 GPa, and more specifically at least 12 GPa (e.g., from 12 to 15 GPa). Draw ratios (for drawing at a draw temperature in excess of 150° C. (e.g., 165° C.)) in excess of 18, are possible with these materials, particularly for a lamellar polymeric body having at least 4 layers including at least a first layer that includes a first polymeric material selected from a thermoplastic polymer, a thermoplastic co-polymer, or a combination thereof, and having a thickness less than about 50 microns, and an adjoining second layer of that includes a second polymeric material selected from a thermoplastic polymer, a thermoplastic co-polymer, or a combination thereof, and having a thickness less than about 50 microns. This is particularly so when wherein the first and second polymeric materials each layer differs relative to each other in composition, degree of crystallization, molecular orientation, molecular weight, melt rate, peak melting temperature, glass transition peak, temperature of crystallization, seal initiation temperature, softening point, molecular weight distribution or any combination thereof (for example, a microlayer that includes a propylene-based polymer, and another different adjoining microlayer).

By way of example, without limitation, one possible two step stretch process is also used in microlayer elongated members that contain between about 3 and 33 layers having ratios of component B to component A of about 3:1 to about 9:1 (e.g., about 4:1). The first stretch is completed at about 65° C. (draw ratio of about 6.5) and the second stretch step is completed at about 165° C. (draw ratio of about 3). Accordingly, as with other stretch operations herein for elongated members having differing characteristics than that just described, one stretch is performed above the melting point of one layer, but below the melting point of another layer, such as the constrained layer. Of course, it will be appreciated that the stretch temperature may vary depending upon the materials selected for the microlayers. For example, without limitation, it is possible that for an elongated member that includes a polyester (e.g., PET), that the drawing temperature may range from about 120° C. to about 250° C. Moreover, it is within the teachings herein to increase the orientation of at least the higher melting point material during stretching, such as by increasing the Hermans Orientation Function, as measured according to the teachings of Zuo, et al., "In Situ Synchotron SAXS/WAXD Studies on Stretching of Isotactic Polypropylene, Poly. Mat'ls. Sci. & Eng., 93 (2005) 761.n addition, microlayer elongated members that combine polypropylene and PET (i.e. Lighter C88 from Equipolymers) are also made (such as having from about 3 to 150 alternating layers, e.g., about 5 to 129 layers). A tie-in layer such as that including maleic anhydride grafted polypropylene (e.g., POLYBOND 3002 from Crompton) may be employed. The five layer material is arranged as such: PP-polybond-PET-polybond-PP with a ratio of 7/3/80/3/7. The 129 layer material is arranged as such: (PP-Polybond-PET-Polybond)n-PP, where n is 32, with the same ratio of materials as in the five layer material. By way of summary, without limitation, the present teachings address the fabrication of microlayer structures that will typically include at least 4 stacked layers, each having a thickness less than about 50 microns, and each layer differs relative to its adjoining layer in at least one characteristic selected from composition, degree of crystallization, molecular orientation, molecular weight, melt rate, peak melting temperature, glass transition peak, temperature of crystallization, seal initiation temperature, softening point, molecular weight distribution or any combination thereof. In one approach, the polymer of at least one or possibly each layer of the elongated member will be a propylene-based polymer (e.g., a polypropylene homopolymer, such as an isotactic polypropylene homopolymer). For example, one or more (or even all) of the layers may employ polypropylene. It is also possible that the polymer of at least one layer includes ethylene. The polymers of at least two adjoining layers may include ethylene (e.g., selected from a propylene-ethylene copolymer, a linear low density polyethylene, a high density polyethylene or any mixture thereof).

A variety of other specific combinations of polyolefinic materials may be employed for microlayers. For example, without limitation, a coextruded multiple layer assembly may formed that includes a polyolefin (e.g., a polyethylene homopolymer) having a melt index below about 4, a molecular weight distribution of less than about 5 and a peak melting point of at least about 128° C., and a polyolefinic adjoining layer (e.g., a co-polyethylene) that has a peak melting point of less than 125° C. The coextruded layers may be subject to at least one stretch at a temperature between about 115 and 141° C. Another specific example includes adjoining microlayers of polypropylenes prepared by Ziegler-Natta catalysts, wherein each of the adjoining layers respectively are a homopolymer, a random copolymer, or alternating layers of homopolymer and random copolymer. Yet another possible combination contemplates the use of a polypropylene homopolymer layer adjoining a polyethylene homopolymer layer, or optionally including an intermediate layer such as a propylene-ethylene copolymer, a random polypropylene, an ethylene copolymer, or a mixture thereof. Typically, the polymers of at least two adjoining layers each have a peak melting temperature that differ by at least about 5° C.

An additive or other functional material may be employed, such as a tie-in layer or an intermediate bonding agent layer between at least two of the stacked layers. Consistent with the teachings elsewhere herein, the materials may include a non-migratory processing or surface modification agent selected from silicones (e.g., dimethylsiloxane), a halogenated polymer, or a combination disposed on an exposed surface of at least one of the layers.

Consolidation and Shaping of Intermediate Forms

At a relatively early stage of the processing (particularly before the intermediate form is shaped) it is desirable, but not mandatory in every instance, that adjoining structural units are movable relative to each other. One approach to achieving this is to form the intermediate form, but not subjecting it to a consolidating processing step by which adjoining structural units will become irreversibly joined together, such as by gluing, melting, fastening or otherwise assembling the units. Void space between units can be filled and the intermediate form densities. Accordingly, it is particularly beneficial at this point that the intermediate form not be consolidated, such as by one or more steps of heating to one or more temperatures above the melting point of at least one of the materials in the form to cause the material to melt and fuse, and effectively weld with adjoining units. Such heating may be done while the intermediate form is constrained or unconstrained. Further, such heating step or steps may be performed with simultaneous application of a force to the intermediate form.

By way of example, without limitation, a generally polyolefinic intermediate form may be consolidated by one or more steps of applying at least about 50 kN (and more specifically, greater than about 150 kN (e.g., 350 kN), while maintaining the form at one or more temperatures above the melting point of the exposed surface of the elongated members (e.g., from about 100 to about 175° C., and more specifically less than about 150° C.) for a sufficient period of time (e.g., about 1 to about 5 minutes). Longer or shorter times are also possible (e.g., consolidating at an elevated temperature for about 0.25 hour, about 0.5 hour, or even longer than about 1 hour).

Resulting intermediate forms may include or consist essentially of a single layer (which optionally may include one or a plurality of patterns). An intermediate form that includes a plurality of layers (which optionally may include one or a plurality of patterns) over some or all of their respective surfaces, is also contemplated. For example, if a plurality of layers is employed, it is possible that one or more layers are different from each other in one or more respect, such as material type, composition of the elongated member, heat treatment of the elongated member, width or other dimension of the elongated member, pattern type, whether the layer is consolidated or not, the presence of a film layer, thickness, morphology, or any combination thereof. To illustrate, it is possible that at least one first layer selected from a film, a coating (e.g., a solvent coating, an extrusion coating or otherwise), a woven form, a winding form, a knit form, a braided form, a randomly dispersed form or any combination thereof adjoins at least one second layer selected from a film, a coating (e.g., a solvent coating, an extrusion coating or otherwise), a woven form, a winding form, a knit form, a braided form, a foam form, a randomly dispersed form or any combination. At least one layer may optionally be a geophysical textile or include microlayers. As indicated, at least one of the first or second layers may be consolidated in this illustration.

In instances when the intermediate form is a single layer, as well as in instances when it is desired to have a plurality of layers as part of an intermediate form, one or more layers may be processed for preventing separation of individual structural units, the respective layers, or both. For example, for a single or multi-layer form, one or more of the layers may be secured (and optionally secured to each other for a multi-layer form) in a suitable manner, such as by thermally joining the structural units along at least a portion of one, two or more of the edges of the form. Other approaches to processing may be employed, such as a mechanical step (e.g., crimping, fastening, stapling, riveting, stitching or otherwise), an adhesive joining step (e.g., with a drop or bead of adhesive, a tape or otherwise), or a combination. In this manner it is possible to readily handle the intermediate forms, such as for transport, storage, placement in a tool cavity or otherwise, while reducing the likelihood that individual structural units will become separated to the extent that the intermediate form integrity is compromised.

Where a plurality of layers are employed in the intermediate form, the number of layers can be selected as desired for the intended application. For example, it is possible that more than two, three, four, five or more layers will be employed. Accordingly, it is envisioned that the intermediate form, in an unconsolidated state may have a thickness as small as the thickness of elongated member in it, but may be greater, such as on the order of about 0.25 to about 2.5 cm or larger. In the consolidated state, accordingly, it is envisioned that the intermediate form may result in a thickness of about 0.8 mm to about 1.5 cm or larger, for example about 0.1 to 0.8 cm or more specifically about 0.3 to 0.5 cm).

In another aspect of the present invention, the intermediate form (which may include one or a plurality of layers as discussed in the above) is shaped to a desired configuration prior to forming a finished article. This shaping can be performed in a consolidation step (e.g., during thermoforming or other forming under elevated temperature or hot-stamping), or even in a cold stamping or other operation for inducing local strain hardening, with or without attendant consolidation. In the course of consolidation, typically, the intermediate form will initially be drapable upon itself. Upon consolidation, the form will become at least semi-rigid, preferably so that it is capable of supporting its own weight. It will be typical that upon shaping and consolidation, the forms of the present invention will be capable of long term shape retention, e.g., greater than 2 weeks, more specifically greater than one month, and even more specifically greater than 3 months. In this manner, it is contemplated that a form manufacturer can generate an inventory of forms, which can then be stored for an extended period until needed for assembly into a composite.

It will be appreciated that in the course of preparing the intermediate forms of the present invention, the forms may be strain hardened (i.e., strengthened or hardened by plastic deformation below the recrystallization temperature range of the constituent materials). Strain hardening may occur before, during or after consolidation. If after consolidation, then it is preferred that strain elongation be kept below about 15% and more preferably below about 10%. If before or during consolidation, the strain elongation amounts can be at least about 10 to 40%. Higher or lower amounts are also possible. One particular approach to shaping of the intermediate form (whether single layer or multi-layer) involves the employment of a resilient structure that permits for displacement (e.g., slippage) of the intermediate form during deformation. Various particular approaches are disclosed, without limitation, co-pending and commonly owned U.S. Provisional Application Ser. No. 60/718,025, filed Sep. 16, 2005, entitled "Apparatus and Process for Manufacturing Shaped Plastic Reinforced Composite Articles," (incorporated by reference). By way of example, it is contemplated that a intermediate form that includes a plurality of thermoplastic elongated members is deformed while displaceably clamping a heated intermediate form during the deforming. The intermediate form is thus clamped in a manner such that while a force is applied for deforming the intermediate form, the intermediate form is free to move without deformation within a predetermined limit. The thermoplastic elongated members of the intermediate form are at least partially consolidated for forming a three dimensional article having a predetermined orientation of the elongated members. Optionally, the intermediate form is stamped in a secondary forming operation (e.g., below the temperature of the displaceably clamping step, such as substantially at or below room temperature).

Of course, many geometries are possible and contemplated within the present invention. Further, the intermediate form need not be a multi-layer form, but can be a single layer. The shaped intermediate form can be further processed as disclosed herein, such as by molding another material in intimate contact with the shaped intermediate form to form a reinforced composite material. As can be seen, shaped intermediate forms of the present invention typically will involve a three-dimensional configuration. Moreover, it is contemplated that the shaped intermediate form in most instances will undergo no visually detectable size or shape transformation when it is processed to form the resulting composite. However, it may be possible, in accordance with the teachings herein, to strain harden the shaped intermediate form prior, during or after consolidation (e.g., by no more than about 10% elongation).

After formation or shaping, an intermediate form optionally may be subjected to a further heat treatment, coating (e.g., priming) or other processing step as desired for modifying one or more of its properties. Moreover, either or both of the elongated member or an intermediate form produced from it may optionally be treated for imparting a functionality to it. For example, it is possible to employ a step of imparting functionality by altering the surface energy, the chemistry (e.g., for increasing cross-linking) or both of the elongated member, the intermediate form or both. A primer (such as a polyolefinic dispersion) may be applied to the surface of an elongated member, an intermediate form or both, as desired.

In one particular aspect, the intermediate forms of the present invention will typically include at least one layer that has a microlayer structure, and the forms are suitably processed for forming a resulting article. Any of a number of different processes may be employed. For example, before or after consolidation, it may be possible to assemble the form with a bulk material (e.g., the aforenoted second thermoplastic material, which may be any suitable form, such as a sheet, a molding, an plate, a tube, etc.) for forming a shaped article that is to be reinforced by the material of the intermediate form, which bulk material is shaped, unshaped or a combination thereof. Any suitable assembly technique may be employed, for example, the intermediate form may be adhesively bonded to the bulk material, it may be mechanically fastened to the bulk material, it may be welded to the bulk material, it may be impregnated or infiltrated by the bulk material, it may be thermally fused with the bulk material, laminated to the bulk material or any combination thereof.

The intermediate form may be assembled (in a consolidated, partially consolidated or unconsolidated state) with the bulk material during a step (which may optionally include constraining one or both of the bulk material and the intermediate form) of thermoforming, vacuum forming, pressure forming, compression molding, blow molding, injection molding, rotational molding, hot pressing, laminating (e.g., extrusion laminating, such as by feeding an intermediate form and a bulk material through a roller, with the intermediate form below and/or above the bulk material), extrusion blow molding, profile extruding, hydroforming or any combination thereof. It is also possible that the intermediate form may itself include an insert or other member or carrier, which combination is together assembled with the bulk material. For example, an extruded profile may be wound with an elongated member, and the combination then assembled with the bulk material.

One specific example involves overmolding, and includes steps of shaping and consolidating the intermediate form, placing the shaped and consolidated intermediate form into a cavity of a tool, and introducing a liquefied bulk material into the cavity with the intermediate form, wherein upon solidifying, the resulting article includes the solidified bulk material molded onto and reinforced with the intermediate form. Even more particularly, it is contemplated that a shaped and consolidated intermediate form including a first thermoplastic material is placed into a cavity of an injection molding tool, and a second thermoplastic material is molded (e.g., insert molded or overmolded) by injection molding a bulk material, namely the second thermoplastic material into the cavity.

The temperature at which the second thermoplastic material is introduced into the cavity is sufficiently high that it causes at least a portion of the intermediate form to melt and resolidify in intimate bonding contact with the second thermoplastic material. In this regard, it may be possible to control the tool temperature into which the second thermoplastic material is introduced to help control the rate of solifidification. For example, one approach is to employ a fluid cooled tool, such as a liquid (e.g., water) cooled tool and to maintain the wall temperature of the tool adjacent the cavity at more than about 15° C., more specifically more than about 30° C., below the melting point of the lowest melting point of the materials in the intermediate form (e.g., the component A material in an A-B or A-B-A type material).

By more specific way of illustration, for injection molding a thermoplastic material (e.g., a polypropylene material) into a tool cavity that has an intermediate form including about 3 to 8 layers of an elongated member having at least components A and B (e.g., a tape where the component A includes a material with a melting point of about 120° C.), a water-cooled tool (e.g., made of a tool steel such as one including chromium and molybdenum (such as P20), PX5, H13, S7 or the like) is used to maintain the wall defining the tool cavity at a temperature of about 80° C. After injection molding, for a typical part that has a wall thickness of about 2 to 4 mm and an overall weight of about 0.3 to 1 kg, the molded article is kept in the tool for about 5 to 60 seconds or more prior to ejection. For example, for articles prepared according to the present invention, it is expected that the time will more typically range from about 15 to 35 seconds. An example of a suitable molding machine is a 300 metric ton Demag injection molding machine.

In yet another aspect of the present invention, large dimensioned parts (e.g., greater than about 0.5 meter, and more specifically greater than about 1 meter, in its largest dimension) are molded to include a reinforcement of the intermediate form in a consolidated state (even if only as little as about 10% by volume is consolidated). By way of example, a reinforced automotive bumper assembly (which may also include one or more other components such as a bumper beam), or other component requiring the use of a large platen tool, may be prepared. In this manner, many parts can be made by injection molding, which heretofore required compression molding for forming a shape.

As indicated previously, the bulk material that is molded with the intermediate form to make a reinforced composite article generally will be a thermoplastic material. Such material may be unfilled or filled (e.g., with one or more of fibers, microspheres, nanoparticles, or otherwise, such as glass, clay, talc or the like). However, in some embodiments, it is possible that the material will be a thermoset plastic (e.g., a urethane, a rubber, an epoxy or otherwise). While it is preferred that the bulk material is a thermoplastic that is of the same generally type as the thermoplastic in the intermediate form, it need not be. Materials that can be used for the second thermoplastic material in the bulk material and/or from which an elongated member may be formed include, without limitation, any of the materials that are used in the first thermoplastic material of the intermediate form and vice versa. Specific examples include thermoplastic olefins polyolefins, ultra high density polyethylene, high density polyethylene, medium density polyethylene, low density polyethylene, very low density polyethylene, ultra high density polypropylene, high density polypropylene, medium density polypropylene, low density polypropylene, very low density polypropylene, polycarbonate, polyvinylchloride, (meth)acrylonitrile, (meth)acrylate, polyurethane, thermoplastic elastomer, thermoplastic olefin, polyamide (e.g., nylon 6, nylon 6,6 or otherwise), polysulfone, polyester, polyalkylene terephthalate (e.g., poly(ethylene terephthalate), poly(butylene terephthalate), poly(1,4-cyclohexanedimethanol terephthalate) or otherwise), polyalkylene naphthalate (e.g., poly(ethylene naphthalate)), acrylonitrile butadiene styrene, polyarylene sulfide (e.g., polyphenylene sulfide), thermoplastic urethane, PPE, polystyrene, or any combination thereof (whether in the form of a copolymer, a blend or an alloy). Any or more of the other polymeric materials described herein may also be employed.

For example, without limitation, one particular approach contemplates that one or both of the bulk material and the elongated member material are selected from polyolefins, polycarbonates, polystyrenes, vinyls, polyamides, polyalkylene terephthalates, polyesters, polyphenylene sulfides, (meth)acrylates or any combination thereof.

It can be seen that the bulk material may be selected so that it can be molded in color. Alternatively, it may be coated for achieving a desired appearance.

Though it is possible that the melting point of the bulk material that is combined with the intermediate form will be below the lowest melting point of any material in the intermediate form, it is expected that more commonly the melting point of the bulk material will be above the highest melting point of any material in the intermediate form. For example, it is possible that a difference between the melting point of the bulk material and the highest melting point of any material in the intermediate form will exceed 10° C., more specifically 30° C., and even more specifically 50° C.

In yet another aspect of the present invention, reinforced composites made according to the present invention exhibit excellent dimensional stability over a broad range of temperatures. For example, the linear coefficient of thermal expansion (−40° C. to +80° C.) may range from about 17 to 24 μm/m-° C., and more particularly is about 19 μm/m-° C.

Following the formation of a shaped composite article, the resulting article may be subjected as desired to one or more post-forming or secondary operations, such as (without limitation) machining, coating, ultrasonic welding, solvent bonding, offset printing, silk screening, hot stamping, engraving, surface treating, bending, pressing, corona discharging, plasma treating, flame spraying, any combination thereof or otherwise.

It should also be appreciated that, in connection with any shaping or consolidation step, it is possible that one or more heating steps are employed for the intermediate form. Such step or any other heating step in accordance with the present invention may be performed by conduction, convection, radiation or any combination thereof. An oven may be used as a heat source. A radiofrequency heat source, a microwave heat source or both may also be used. Heating may be done in an inert atmosphere, or in air. Further, heating steps may include a plurality of steps each performed at a different temperature, each performed under application of a different pressure, or a combination thereof.

Figure 3:
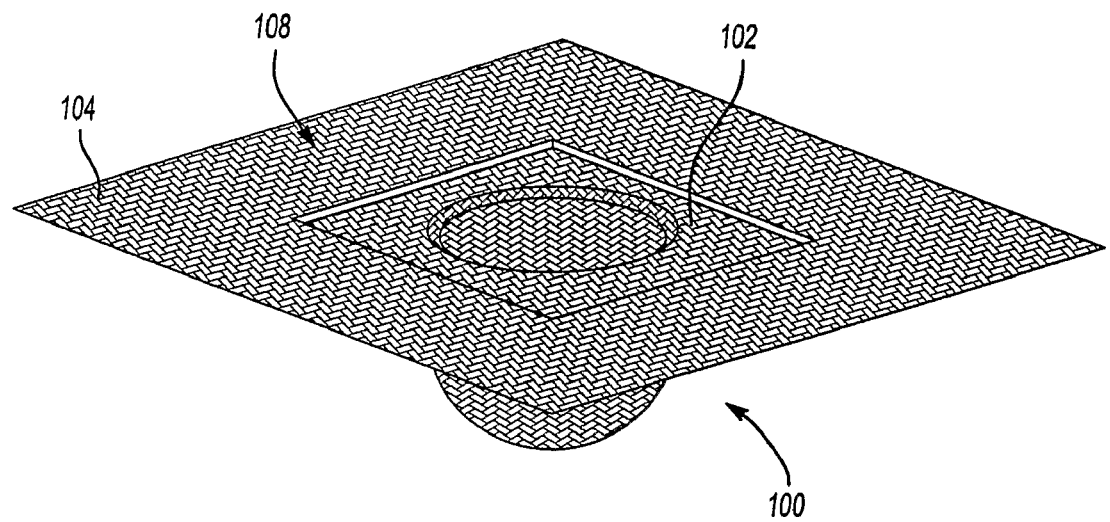
FIG. 3 is a perspective view of an illustrative shaped intermediate form in accordance with the present teachings.

With reference to FIG. 3, there is shown an illustrative example of a shaped three dimensional article 100. The article has an upper surface 102. Though loose fibers or frayed edges may result at a periphery 104, depending upon processing steps, they may be obviated (e.g., it is contemplated that they may be removed by a suitable punching, trimming or other cutting step, or avoid by a suitable step for joining edges of the intermediate form. An interior portion of the article 106 may be consolidated relative to a portion 108 that is not consolidated. Illustrated as prepared from a multi-layer drapable form that employs a weave of tape. The loose fibers shown are for illustration, and it is contemplated that they will be removed by a suitable punching, trimming or other cutting step.

To the extent not already disclosed other variations of the present invention are also contemplated. For example, the elongated members may consist essentially of a single type of material (e.g., a thermoplastic such as a polyolefin), or it may include a different type of material, such as one selected from glass fiber (e.g., E-glass, S-glass or otherwise), carbon fiber, a metal fiber, a different plastic fiber (e.g., aramid fiber), ceramic fiber (e.g., silicon carbide fiber), a natural fiber, combinations thereof or otherwise. Elongated members may be coated or uncoated. An intermediate form may be impregnated with a suitable chemical agent, polymer compound, filler or other impregnant. Surface finishes, additional layers or both may be applied to intermediate forms or resulting shaped articles, including for example one or more component for reducing static, light stabilization, hydrophilicity, hydrophobicity, fire retardancy, coloring, conductivity or any combination thereof.

As to the foregoing, it will be appreciated that the ability to form an aesthetically pleasing article is another potential benefit of the present invention. For example, one embodiment contemplates the use of a plurality of elongated members in an intermediate form of different width, thickness, color, any combination thereof, or otherwise. In this manner a desired texture, topography, pattern, or other characteristic can be obtained. In addition, the formation of complicated shapes is possible and is done in accordance with the present invention, such as the formation of ribs, fillets, corrugations or other protuberances.

It is also possible to employ the intermediate forms of present invention in articles that also employ in combination a woven or non-woven fibrous (e.g., continuous or chopped glass or otherwise) mat.

It is also possible in accordance with the present invention to employ an intermediate form as described as a substitute for a plastic film in multilayered (e.g. laminated) articles.

In addition to the above, it is also possible that a plurality of the elongated members of the present invention can be chopped and randomly or controllably dispersed within an intermediate form of the present invention. Other aspects can be gleaned with reference to U.S. Pat. No. 5,872,067, incorporated by reference.

Applications

Articles made in accordance with the present invention exhibit excellent impact resistance and other mechanical properties. It is contemplated, for example, that automotive vehicle components will meet or exceed standards for energy management in side impacts, knee bar and glove box door impact, header and rail head impacts and/or bumper performance, such as United States Federal Motor Vehicle Safety Standard ("FMVSS") 214, FMVSS 208, FMVSS 201, and/or otherwise embodied in 49 C.F.R. 581.

Other possible variations can be gleaned by reference to existing literature such as, without limitation, WO 2004/028803; WO 03/008190; WO 98/46422; WO 94/12334; WO 91/11324; U.S. Pat. Nos. 6,710,253; 6,045,923; 5,993,711; and EP 1403038A1, all of which are hereby incorporated by reference.

The materials of the present invention are suitable for any of a number of different applications, ranging from automotive vehicle components, to construction materials, to appliances, and other applications. Examples include, without limitation, a spare tire well liner, a cargo liner, a bed-liner, a seat back, a vehicle dashboard, vehicle instrument panel, a knee bar, a glove box, vehicle interior trim, a bumper, a spoiler, an air diffuser, a hood scoop, an air dam, a fuel tank, a sun roof deflector, a vehicle stone guard, an automotive body panel, a vehicle wheel well liner, a shifter knob, a switch knob, a hand-brake brake handle, a luggage roof box, a door handle, body armor, a helmet, a boat hull, a flotation device, a shipping container, luggage, an attaché, a shin guard, an elbow pad, a knee pad, a chest protector, a face mask, a pipe, a tabletop, a pressure vessel, a protective shield, downhole drilling equipment housing, a boat hull, a safe, a lock, a fluid container, a flooring, a wall or other panel, roofing, a refrigerator housing, a washer/dryer housing, benches, seats, rails, a hand tool, a prosthesis, an orthotic, a wheelchair or component thereof, a television housing, audio equipment housing, a portable tool housing, a camera housing, a consumer electronic product housing, an air conditioner compressor housing, a beam, a girder, a fascia, a shutter, shoe soles or otherwise.

In one aspect, the materials of the present invention find particularly useful application in the construction of pipes or vessels, particularly pipes or vessels that will be used as a protective covering, will carry a fluid or both. For example, the present invention contemplates processes for making pipes for heavy-duty industrial applications, such as for transferring chemical reactants or products or channeling, water, sewage or even gas, such pipes being generally rigid or semi-rigid, and optionally flexible over some or all of its length.

The pipes made using the materials of the present teachings show good physical characteristics such improved hoop stress performance, ring stress performance, durability and low temperature impact resistance performance, particularly as compared with unreinforced pipes of similar material.

As seen with reference to FIGS. 4A-4D, construction of a pipe 200 in accordance with the present invention may consist essentially of a single wall 202, or as in FIG. 4B it may include two or more walls 204 and 206. Where a plurality of walls are employed, they may be concentric, as in FIG. 4B, or they may comprise a one or more outer walls 208 and one or more interior disposed walls 210 (which in turn may be a single or plural layer construction), such as for defining subdivided pipes, as in FIG. 4C. They may be straight or wound over at least a portion of their length. The wall structure may include one or more rounded, flat, or curved sections). Other structures are also possible. FIG. 4D illustrates an example of one preferred construction in which a jacket 212 overlies the structure of FIG. 4B. The jacket may also overlay the embodiments of FIGS. 4A and 4C. The jacket is shown as adjoining the underlying structure in contact therewith, but it may also be spaced therefrom over at least a portion of its interior.

The wall 202 defining the pipe of FIG. 4A may generally consist essentially of an intermediate form (particularly one that includes a microlayer structure, and has been consolidated) as described herein in accordance with the present invention. For pipes of the type as shown in FIGS. 4B and 4C, at least one of the wall structures will include an intermediate form according to the teachings herein (e.g. prepared from the previously discussed components A and B). The intermediate form commonly will be in a consolidated state, but it may also be substantially unconsolidated. Portions of the pipes other than that including the intermediate form may comprise any material suitable for making a pipe, hose or conduit and may be metal, plastic, composite, mono-layer, multi-layer or otherwise made of a suitable material. Preferably the core pipe comprises a polymer (e.g. polyolefin), and more preferably of polyethylene, polypropylene or PET. In one aspect, a wall of the pipe may be made of any of the materials discussed herein. For example, the core pipe may be a extruded member having one or more components (e.g. the previously discussed components A and B). In one specific embodiment, the pipe includes a pressure classified polyethylene with a suitable stabilization package having a suitable pressure rating (e.g. equal to or greater than PE 80 as measured by ISO9080).

Figure 4E:
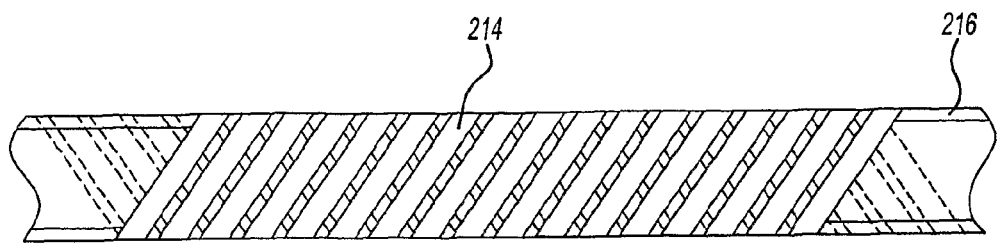
Figure 4F:
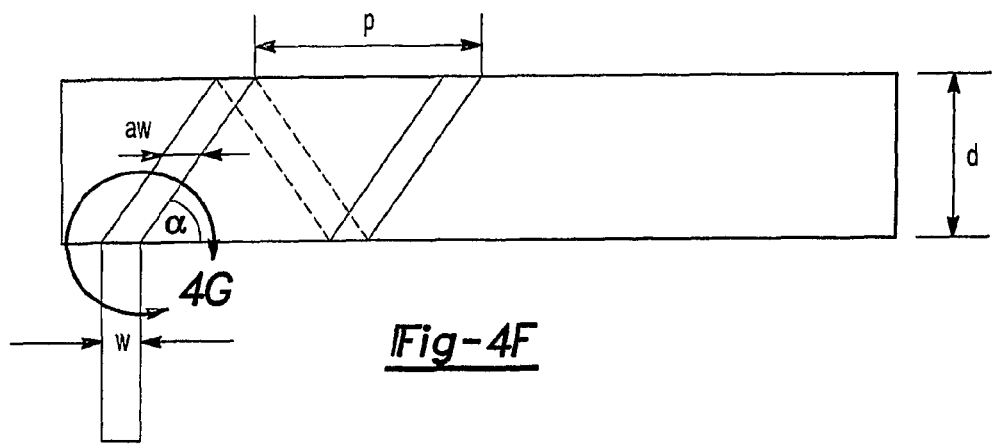
Figure 4G:
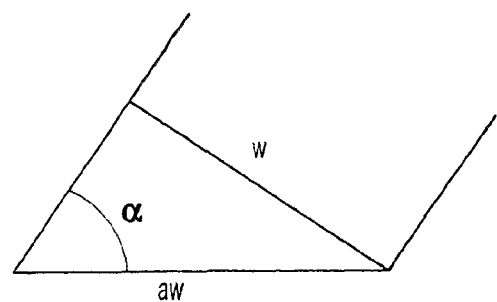

As seen in FIG. 4E-G, the elongated member 214 (having a width (w)) of the intermediate form may be wrapped or wound (e.g., helically) around a core pipe 216 in a manner suitable for making hose or pipe, and optionally consolidated. In one aspect, multiple elongated members may be braided together to cover the core pipe, which may in turn lead to increased durability and low temperature impact resistance of the pipe. Any suitable angle ($\alpha$) may used for the winding(s) of the elongated members around the core pipe, with the angle being preferably about 30° to 90° relative to the perpendicular axis of the pipe. More preferably, the angle of the winding angle is greater than about 45°, and more preferably greater than 50° but less than 55° (e.g., about 45° to 54°). In one aspect, for achieving an especially attractive combination of axial and hoop stress performance, an angle of about 54.7°. However, it should be appreciated that even larger winding angles are desirable if possible, such as greater than about 60° (e.g., from 60 to 75°), or even greater than about 75°. Any suitable intermediate form may be employed, including windings, weaves or a combination. Consecutive windings may adjoin or overlap each other, or they may be spaced relative to each other such as by a pitch distance (p), which may range up to about 10, 25 or even about 50 mm or more, such as for a pipe having a diameter (d) of from about 5 to 500 mm, 1000 mm or even 2000 mm, and more specifically about 10 mm to 100 mm or larger. The number of layers of windings may vary for achieving the desired properties in the resulting pipe. For example, the number of winding layers may range from about 1 to 100, or even from about 2 to 50. Some embodiments may employ up to about 25 winding layers, and some may contain as few as about 10 or less winding layers.

In one aspect, the core pipe is covered with multiple layers of elongated members, such as two, three, four, five or more layers. The same or different materials may be used for each layer. In a preferred embodiment, at least two layers of the same materials are used to cover the core pipe. Each layer is counterwound in the opposite direction at an identical angle to the perpendicular axis enabling a balanced layer structure. It should be appreciated, of course, that as between each winding layer it is possible to vary the winding angle, to vary the composition or other characteristic of the elongated member, to vary the width or thickness of the elongated member, to apply a film layer, to apply a coating, to vary the pitch distance, or any combination thereof. The step of winding can be performed at room temperature. It may also be performed at an elevated temperature (e.g., at least about 40° C.

In addition, an optional, but preferred, protective jacket may be included on the pipe over some or all of the external surface. For example, it will lie over at least a portion of the outermost layer of the core pipe/intermediate form assembly. The protective jacket may be any material which increases resistance of the pipe to abrasion, scratching, slitting, chemical exposure, UV light or other types of damage and may contain agents that otherwise increase the long term stability of the material. Preferably, the protective jacket comprises a pressure classified polyethylene with a suitable pressure rating (e.g. equal to or greater than about PE 80 as measured by ISO9080).

The pipe may be consolidated at any point, and generally thereafter will exhibit a substantial retention of morphology from its initial state in any elongated member portion. For example, the core pipe may be consolidated before being covered by the jacket. In one preferred approach, the pipe is consolidated after one or more of the layers cover the pipe core or after the protective jacket covering has been added. In addition, multiple consolidation steps may be utilized, although only one consolidation step is preferred. One advantageous approach is to apply an intermediate form over a pipe and then consolidate the intermediate form (e.g., by conducted heat, convective heat, radiant heat, or a combination thereof). Consolidation may take place at an elevated temperature (e.g., for a polyolefinic elongated member) of about 100 to about 175° C., and more specifically less than about 150° C.) for a sufficient period of time (e.g., about 1 to about 5 minutes). Longer or shorter times are also possible, e.g., up to about 0.25 hour or longer (as taught previously). In the course of consolidation, assuming the material of the elongated member of the intermediate form will at least partially melt and fuse to the pipe. Under such approach, it is possible to secure the reinforcement layers from the intermediate forms to the underlying pipe without an optional step of laser welding or other local heat treatment.

Preferably, the pipes constructed according to this invention meet or exceed the following physical parameters, such as hoop stress performance of greater than about 10 MPa at 20° C. for 50 years; slow crack growth (SCG) performance (per test method ISO 13479) of greater than at least 500 h, and more particularly greater than 1000 h at 9.2 bar at 80° C.; rapid crack growth (RCP) performance (per test method ISO 13477) of greater than 10 bar at 0° C.; or a combination of both characteristics In one exemplary embodiment, a pipe is constructed with an inner pipe (e.g., a thermoplastic inner pipe, such as a polyethylene, a polypropylene or a combination thereof, two exterior layers of consolidated coextruded tapes, which initially are applied to the inner pipe as an unconsolidated winding or woven intermediate form. The tapes have at least an A-B component structure as described elsewhere herein, and particularly a microlayer structure having plural alternating A and B layers. In one particular example, before applying the tapes to the inner pipe, the tapes will have been drawn to a draw ratio of at least 4, more specifically at least 8, and even more specifically, at least 12 (e.g., 16). Each layer of coextruded tapes is applied by winding at least one elongated member at a winding angle of from about 50 to about 60° (e.g., 54°). The tapes are consolidated while disposed on the inner pipe by heating at above 150° C. for at least one minute (e.g., at 160° C. for four minutes), but preferably shorter than about 0.25 hour. When compared to the core pipe alone, the exemplary pipe shows at least a 20% and more preferably at least a 30% better burst strength (per test method ISO 1167, using a pressure increase of 1 bar min$^{-1}$ until failure). When hoop stress performance (per test method ISO 1167) is compared (using 80° C. at 7 MPa), the core pipe alone fails in under 10 hours, while the exemplary pipe fails only after about 250 hours. An exemplary pipe made with four layers of coextruded tapes, similar to that described above exhibits no failures for at least 500 hours, and more preferably at least about 1000 hours of testing.

As gleaned from the foregoing, the present invention also contemplates a method of doing business, pursuant to an unconsolidated intermediate form is supplied by a first entity to a second entity in combination with delivery of bulk material (e.g., polypropylene). The second entity consolidates the intermediate form for shaping it and then molds a composite article with the consolidated form in it. Alternatively, a consolidated intermediate form is supplied by a first entity to a second entity in combination with delivery of bulk material. The second entity then molds a composite article with the consolidated form in it. The first or the second entity may vacuum form, stamp, press, thermoform an article with the consolidated form, in addition to or in lieu of molding. As can be seen, the first entity may supply the intermediate form in a shaped form, or as a flat sheet. It is also possible that a single entity makes the intermediate form and the resulting composite article incorporating it.

In the following examples, which are not intended as limiting the invention, the use of microlayer structures can be made for any multilayer structures and will exhibit comparable or better performance to that disclosed.

EXAMPLE 1

Figure 5A:
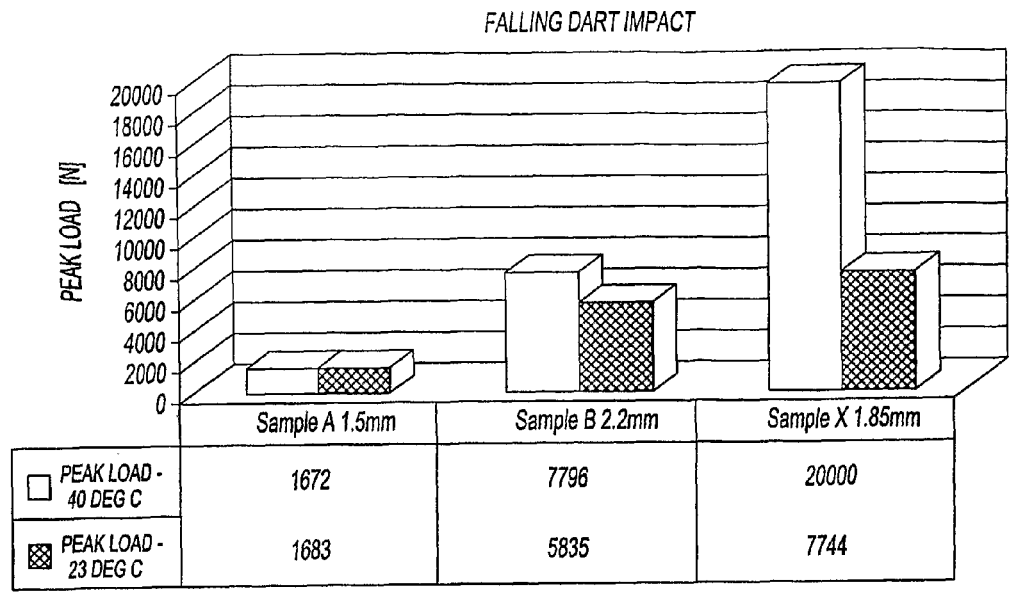
FIGS. 5A and 5B illustrate exemplary comparative data obtainable with the present teachings.
Figure 5B:
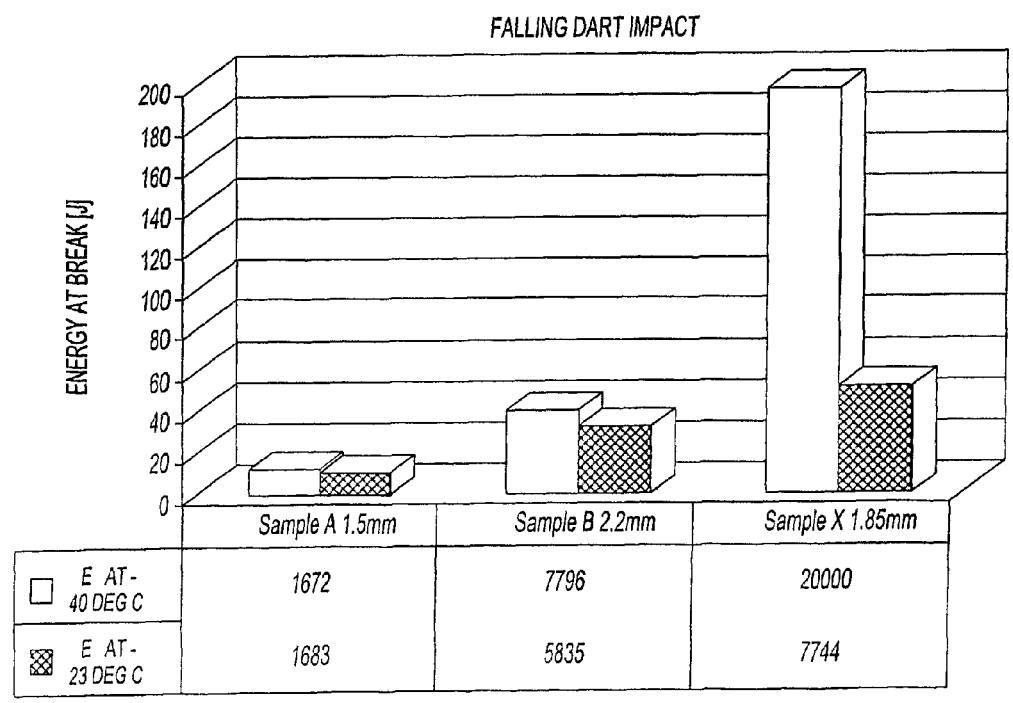

Performance of a consolidated sheet (1.85 mm thickness) of coextruded tape including an propylene-ethylene copolymer co-extruded with a polypropylene homopolymer as disclosed herein (designated as Sample X) (about 0.04 mm thick by 3 mm wide) is compared with the performance of materials such as that available commercially under the designation CURV™ (denoted respectively as "Sample A" and "Sample B") in the 1.5 and 2.2 mm thicknesses shown, using a falling dart impact test (per ISO 7765-1) at room temperature and at (−)40° C. FIGS. 5A and 5B illustrate data obtainable according to a preferred embodiment of the present invention.

EXAMPLE 2

A spare tire bin is injection molded with a polypropylene bulk material, along with a three layer (3L) consolidated twill woven coextruded polypropylene tape (about 0.04 mm thick by 3 mm wide) intermediate form on one side of the polypropylene bulk material. The resulting article is ruck free and exhibits a 400% improvement as compared with a 40% long glass fiber composite with a 20% glass filled polypropylene matrix, when impacted at 8 MPH at −30° C. A complete ductile break is observed without shattering; i.e., no flying pieces are observed during impact.

EXAMPLE 3

Example 2 is repeated but the intermediate form is placed on both sides of the polypropylene bulk material, exhibiting enhanced stiffness and impact resistance relative to the Example 2 composite.

EXAMPLE 4

Example 3 is repeated but with a monolayer polypropylene tape in the twill weave of the intermediate form. The resulting article is ruck free and exhibits improvement as compared with a 40% long glass fiber composite with a 20% glass filled polypropylene matrix, when impacted at 8 MPH at −30° C. A complete ductile break is observed without shattering.

EXAMPLE 5

Figure 6A:
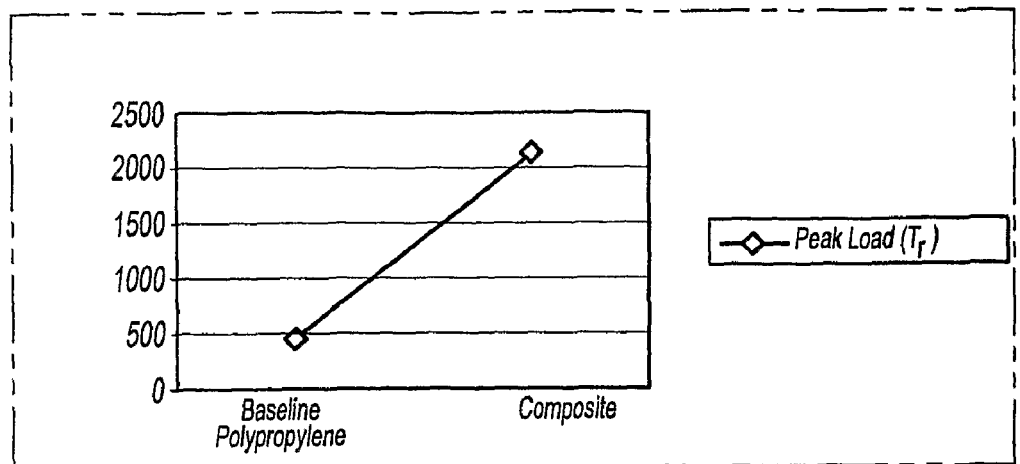
FIGS. 6A and 6B illustrate exemplary data obtainable with the present teachings.
Figure 6B:
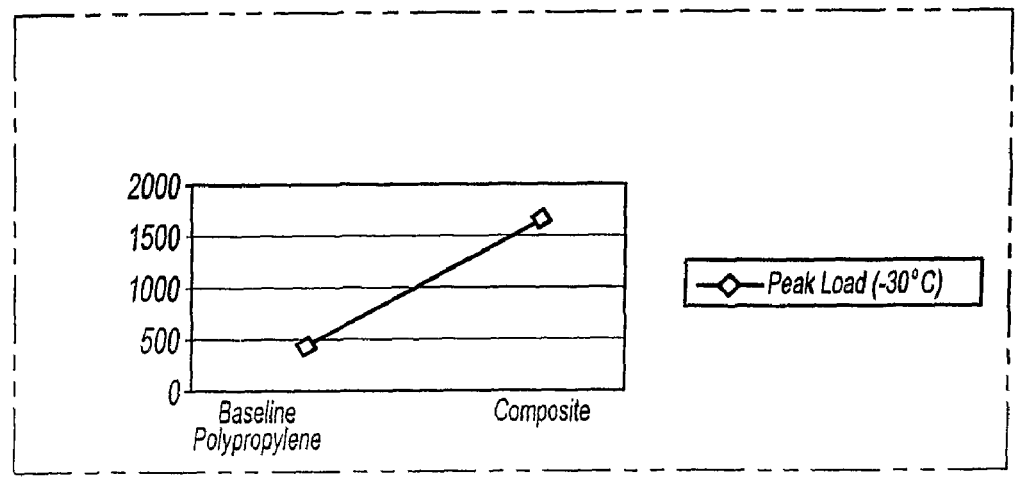

A sample of a spare tire bin (2.2 cm deep, 15 cm wide, 25 cm long and wall thickness of 2.25 mm) composite is fabricated from a consolidated six layer (6L) intermediate form made with woven coextruded polypropylene tape (each layer being about 0.18 mm thick consolidated). The intermediate form is positioned on the bottom of the bin. It is impact tested and compared with baseline blow molded material a 30% short glass fiber reinforced polypropylene. The test employs an actuator velocity of 8 mph, a fixture with a 5.1 cm round impactor. The test is done at room temperature and at −30° C., and involves hitting the bottom of the bin, off center, with the intermediate form positioned so that it is in tension for receiving the load. The results are shown in the graphs of FIGS. 6A and 6B.

EXAMPLE 6

By way of illustration of one constrained consolidation operation for a multiple layer woven intermediate form, it is possible that a compression moulding press with manual controls is heated-up to pre selected temperature (e.g., from 110 to 150° C.). A woven intermediate form in accordance with the above teachings is cut to the same size as the plates of the press (e.g., 30×30 cm, with the fabric being cut parallel with the direction of the fibers). Layers of the fabric are stacked up and placed between a protective layer (e.g., a Mylar film), and this stack is placed between a top and a bottom metal plate, which is delivered to the press. The press is immediately closed, and a force is applied (e.g., 150 kN is applied for 1 minute). Subsequently, the force is increased (e.g., to 350 kN for 3 minutes). Press heating is switched off and open water cooling of the press is performed, while the workpiece is still under pressure. The press is opened and the plates and Mylar film is removed. The resulting workpiece exhibits consolidation (e.g., with a density greater than 95% theoretical density).

EXAMPLE 7

By way of example of one thermoforming operation, a compression moulding press (e.g., a manually operated one equipped with a mold for square cups dimensioned as 20×20×4 cm). Extruded polypropylene sheet is laminated on both sides with a layer of a woven intermediate form (e.g., by sheet extrusion). The laminated sheet is heated in the press (5 minutes contact heat) followed by thermoforming and cooling the press under pressure before demoulding. The temperatures of different samples are varied from 180 to 165 to 150° C. It is observed that delamination near the highly stressed and sharp corners becomes lower at the reduced temperatures.

EXAMPLE 8

A consolidated intermediate form (30×30 cm plate surface) is thermoformed on a manual Fonteyne compression moulding press, equipped with a square cup mold. The initial forming temperature ($T_{male\ side\ and\ female\ side}$) is 150° C. It is heated 5 minutes in the press, by contact heat. Then the press is closed and for 1 minute a force of 50 kN is applied. The resulting article exhibits an attractive surface finish.

EXAMPLE 9

An extruder (operated at a temperature of 165 (drop-in) to 190° C., and a die temperature of 200° C.) is used. Upper, middle, and lower roll temperatures are respectively 90, 80, and 40° C. A line speed of 0.8-0.10 m/min is used. The feed stock has a sheet width of 35 cm, a thickness of 1.0 to 1.2 mm polypropylene, and the intermediate forms are each 0.2 mm thick and 50 cc wide. The intermediate forms are fed at the first roll from above, and in a separate run, the intermediate forms are fed at the first roll from below. In yet another run, opposing layers of the intermediate form are fed from the top and the bottom at the first roll. Good adhesion is obtained, with no or insignificant amounts of warpage detected.

As can be appreciated from the above, articles made in accordance with the present invention exhibit a number of beneficial characteristics including, without limitation, recyclability, the ability to reduce wall thickness (and attendant weight and material cost savings) as compared with unreinforced materials, good low temperature impact resistance, shatter-free on impact, good long term creep resistance, good long term fatigue resistance, good abrasion resistance, long term dimensional stability, or any combination thereof.

By way of example, without limitation, as compared with glass filled polypropylene materials, a self-reinforced composite (e.g., polypropylene composite) (with a density of about density of 0.8 g/cc) in accordance with the present invention is capable of doubling, tripling or even quadrupling baseline room temperature toughness and lower temperature toughness.

It should be appreciated that in one particular aspect of the present invention, many of the foregoing properties are the result of a combination of materials selection and processing conditions that result in high degrees of retained morphology, for example, the preservation of substantial orientation within the elongated member component of the intermediate form throughout all processing steps until completion of the finished article. Specifically, one approach of the present invention is to avoid any step of consolidating the intermediate form prior to thermoforming, stamping or other intermediate form shaping step. Prior materials would employ a consolidation step prior to any such intermediate form shaping step. However, such orientation of preservation is not mandatory for many of the novel embodiments disclosed herein. Accordingly, the skilled artisan will recognize that various of the prior art materials that employ a consolidation step prior to an intermediate form shaping step may still be employed for making composites within such embodiments. In addition, it is possible that multi-layer intermediate forms may be employed with fewer than all of the layers having been processed for maintaining orientation.

Reference herein to "first" and "second" are not intended as limiting to combinations that consist of only first and second items. Where so-referenced, it is possible that the subject matter of the present invention may suitably incorporate third, fourth or more items. Reference to "elongated member" is not intended to foreclose coverage of a plurality of elongated members. Further, reference to "(meth)acrylate" refers to either or both of acrylate and methacrylate. Except where stated, the use of processing steps such as "consolidating" or "shaping" or their conjugates do not require complete consolidation or shaping; a partial consolidation or shaping is also contemplated. The disclosure of an "A-B" component structure does not foreclose the presence of additional layers, or additional materials that differ from components A and B. Moreover, the disclosure of "a" or "one" element or step is not intended to foreclose additional elements or steps. Use of the term "about" or "approximately" in advance of a range denotes that both the upper and lower end and not intended as being bound by the amount recited in the range (e.g., "about 1 to 3" is intended to include "about 1 to about 3"). Unless otherwise stated, or as dictated otherwise by the context of usage, references to "mixtures" or "combinations" of polymers contemplates alloys, blends or even co-polymers of such polymers.

Unless stated otherwise, dimensions and geometries of the various embodiments depicted herein are not intended to be restrictive of the invention, and other dimensions or geometries are possible. Plural structural components step can be provided by a single integrated structure or step. Alternatively, a single integrated structure step might be divided into separate plural components or steps. However, it is also possible that the functions are integrated into a single component or step. "Comprising", "having", and "including" and their word forms also contemplate the more restrictive terms "consisting of" and "consisting essentially of".

In addition, while a feature of the present invention may have been described in the context of only one of the illustrated embodiments, such feature may be combined with one or more other features of other embodiments, for any given application. For example, microlayer elongated members may be incorporated into pipes, pipes may be utilized in combination with bulk materials and intermediate forms, thermoset materials may be included in the elongated members, microlayers may be included in elongated members other than coextruded tapes, or materials mentioned with regard to one component or aspect of the invention may used in other aspects of the invention. It will also be appreciated from the above that the fabrication of the unique structures herein and the operation thereof also constitute methods in accordance with the present invention.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

Appendix

Without limitation, unless otherwise set forth, the following are examples of test procedures that are used for realizing the properties taught herein and recited in the claims.

Degree of crystallinity is measured by differential scanning calorimetry (DSC) using a Q1000 TA Instrument. In this measurement a small ten milligram sample of the propylene polymer is sealed into an aluminum DSC pan. The sample is placed into a DSC cell with a 25 cubic centimeter per minute nitrogen purge and cooled to about minus 100° C. A standard thermal history is established for the sample by heating it at 10° C. per minute to 225° C. The sample is kept at 225° C. for 3 minutes to ensure complete melting. The sample then is cooled at 10° C. per minute to about −100° C. The sample is again kept isothermal at −100° C. for 3 minutes to stabilize. It is then reheated at 10° C. per minute to 225° C. The observed heat of fusion ($\Delta H_{observed}$) for the second scan over a range of 80-180° C. is recorded. The observed heat of fusion is related to the degree of crystallinity in weight percent based on the weight of the sample (e.g., sample of polypropylene) by the following equation: Crystallinity %=($\Delta H_{observed}$)/($\Delta H_{isotactic\ pp}$)×100, where the heat of fusion for isotactic polypropylene ($\Delta H_{isotactic\ pp}$) is reported in B. Wunderlich, Macromolecular Physics, Volume 3, Crystal Melting, Academic Press, New York, 1960, p 48, is 165 Joules per gram (J/g) of polymer. The peak temperature of crystallization from the melt is determined by the DSC as above with a cooling rate of 10° C./min. The melting temperature is determined by the peak of the melting transition. A similar analysis would apply for materials other than polypropylene, substituting reported $\Delta H$ values for the other materials.

Molecular weight distribution (MWD) (e.g., for the polypropylene homopolymers) is determined by gel permeation chromatography (GPC) as follows. The polymers are analyzed by gel permeation chromatography (GPC) on a Polymer Laboratories PL-GPC-220 high temperature chromatographic unit equipped with four linear mixed-bed columns, 300×7.5 mm (Polymer Laboratories PLgel Mixed A (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. A 0.2% by weight solution of the sample is prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent molecular weights for the sample polymer (e.g., polypropylene) are determined by using appropriate Mark-Houwink coefficients (as described by Th. G. Scholte, N. L. J. Meijerink, H. M. Schoffeleers, and A. M. G. Brands, J. Appl. Polym. Sci., 29, 3763-3782 (1984), incorporated herein by reference) and polystyrene (as described by E. P. Otocka, R. J. Roe, N. Y. Hellman, P. M. Muglia, Macromolecules, 4, 507 (1971) incorporated herein by reference) in the Mark-Houwink equation: $\{\eta\}=KM^a$, where $K_{pp}=1.90E-04$, $a_{pp}=0.725$ and $K_{ps}=1.26\ E-04$, $a_{ps}=0.702$, for analysis of a polypropylene sample.

Unless otherwise indicated, for the materials listed herein, 1% Secant flexural modulus is determined by ASTM D790-00; density is measured per ASTM D792; melting temperatures are derived by differential scanning calorimetry per ISO 11357-3; and flexural modulus is determined per ISO 178.

Melt flow rate is measured in accordance with ASTM D 1238-01 test method at 230° C. with a 2.16 kg weight for the propylene-based polymers. Melt index for the ethylene-based polymers is measured in accordance with ASTM D 1238-01 test method at 190° C. with a 2.16 kg weight.

Xylene solubles are determined by dissolving 4±0.1000 g. of sample into a 250 ml Erlenmeyer flask and adding by means of a pipette 200 ml of inhibited xylene. To inhibit xylene, add 18.35 g of Irganox 1010 to 200 mls. of xylene in a beaker and stir until dissolved. After the Irganox 1010 is dissolved, pour the solution into a 4.9 gallons of xylene and thoroughly mix the solution. Introduce a stirring bar, place a water-cooled condenser on the flask and position the flask assembly on a magnetic stirrer/hot plate. Stir vigorously and adjust heating to obtain gentle boiling until the sample is completely dissolved. A nitrogen blanket should be maintained on the condenser during the procedure. After the sample is dissolved, remove the flask assembly from the magnetic stirrer/hot plate, remove the stirring bar, then cover. Let the flask cool to near room temperature (30° C., cooling takes approximately 1 hour). Place a lead ring on the flask and immerse in constant temperature water bath. After temperature inside flask reaches 25±0.5° C., let stand in water 30 more minutes. During the cooling, the insoluble portion precipitates. The solution is filtered; then a 100 ml aliquot of the filtrate is placed in an aluminum pan and evaporated to dryness under a nitrogen stream. The solubles present are determined by weighing the residual polymer.

Isotactic pentad percent, Isotactic triad percent and the Isotactic pentad/triad ratio are determined by one of ordinary skill in the art according to the following: $^{13}$C nuclear magnetic resonance (NMR) provides a direct measure of the tacticity of poly(propylene) homopolymers. The analysis used here neglects chain ends and inverse insertions. For the triad names (mm, mr, and rr) 'm' stands for meso, and 'r' stands for racemic. The isotactic triad percent is a measure of the mm triads. V. Busico, R. Cipullo, G. Monaco, M. Vacatello, A. L. Segre, Macromolecules 1997, 30, 6251-6263 describes methods for determining isotactic pentad and triads using NMR analysis.

The isotactic pentad/triad ratio is the ratio of the isotactic pentad percent to the isotactic triad percent. In determining the isotactic pentad and triad values, the samples are prepared by dissolving 0.5 g of the polypropylene homopolymer in a mixture of 1.75 g of tetrachloroethane-d2 (TCE-d2) and 1.75 g of 1,2-orthodichlorobenzene. Samples are homogenized in a heating block at 150° C. and heated with a heat gun to facilitate mixing. NMR experiments are performed on a Varian Unity+400 MHz, at 120° C., using a 1.32 sec acquisition time, 0.7 sec repetition delay, 4000 acquisitions and continuous proton decoupling (fm-fm modulation), with and without spinning the sample. Total scan time used is 2.25 hrs.

The invention claimed is:

1. An elongated member, comprising: at least 10 stacked and coextruded polymer layers that each are continuous in profile and include a polyolefinic polymer, each layer having a thickness less than about 50 microns, and at least two adjoining layers differ relative to their peak melting temperature and differ in their molecular orientation, and wherein the member is prepared by drawing at a draw ratio of greater than 18 wherein the drawing includes a step of stretching at a temperature above the melting point of one of the adjoining layers and below the melting point of the other adjoining layer.

2. The elongated member of claim 1, wherein the polymers of at least two adjoining layers include propylene.

3. The elongated member of claim 1, wherein the polymers of at least two adjoining layers include ethylene.

4. The elongated member of claim 1, wherein the polymers of the at least two adjoining layers each have a peak melting temperature that differ by at least 5° C.

5. The elongated member of claim 1, wherein the polymer of at least one of the layers has a melting point below 125° C., and an adjoining layer has a peak melting point above 160° C.

6. The elongated member of claim 5, wherein the A component includes a propylene-ethylene copolymer that exhibits a melt flow rate at 230° C. per ASTM D1238 of 0.3 to 50 g/10 min; a density per ASTM D792 of 0.858 to 0.888 g/cc; an ethylene content of 5 to 25 wt %; a Melting Range from 50 to 135° C.; a Shore A Hardness from about 40 to about 90; and a flexural modulus per ISO 178 of 10 to 280 MPa and the B component includes a polypropylene homopolymer that exhibits a melt flow rate at 230° C. per ASTM D1238 of less than 7 g/10 min; a 1% secant flexural modulus of greater than 2000 MPa; a crystallinity of at least 70%; an isotactic pentad/triad ratio of greater than 85%; and a peak melting temperature of greater than 160° C.

7. The elongated member of claim 6, further comprising a dimethylsiloxane agent disposed on an exposed surface of the elongated member.

8. The elongated member of claim 6, further comprising a tie-in layer or an intermediate bonding agent layer that includes maleic anhydride-grafted polypropylene disposed between at least one of the component A and component B layers.

9. The elongated member of claim 1, further comprising an additive or other functional material.

10. The elongated member of claim 9, wherein the additive or other functional materials is a tie-in layer or an intermediate bonding agent layer between at least two of the stacked layers.

11. The elongated member of claim 10, wherein the tie-in layer or the intermediate bonding agent layer includes a polyolefin with a functional reactive group.

12. The elongated member of claim 11, wherein the tie-in layer or the intermediate bonding agent layer includes maleic anhydride-grafted polypropylene.

13. The elongated member of claim 1, further comprising a non-migratory processing or surface modification agent selected from silicones, a halogenated polymer, or a combination disposed on an exposed surface of at least one of the layers.

14. The elongated member of claim 13, wherein the non-migratory processing or surface modification agent is dimethylsiloxane.

15. The elongated member of claim 1, wherein the layers are prepared from 2 different polymeric components, denoted A and B, and further wherein the structure of the assembly of layers is $((A\text{-}B)_n\text{-}A)$ and wherein n is at least 10.

16. The elongated member of claim 15, wherein n is at least 100.

17. The elongated member of claim 1, wherein at least one layer includes a propylene-ethylene copolymer that exhibits a melt flow rate at 230° C. per ASTM D1238 of 0.3 to 50 g/10 min; a density per ASTM D792 of 0.858 to 0.888 g/cc; an ethylene content of 5 to about 25 wt %; a Melting Range from 50 to 135° C.; a Shore A Hardness from 40 to 90; and a flexural modulus per ISO 178 of 10 to 280 MPa.

18. The elongated member of claim 1, wherein at least one layer includes a polypropylene homopolymer that exhibits a melt flow rate at 230° C. per ASTM D1238 of less than 7 g/10 min; a 1% secant flexural modulus of greater than 2000 MPa; a crystallinity of at least 70%; an isotactic pentad/triad ratio of greater than 85%; and a peak melting temperature of greater than 160° C.

19. The elongated member of claim 1 wherein the form of the elongated member is selected from the group fibres, rods, cords, yarns, tapes, filaments, straps or any combination thereof.

20. The elongated member of claim 1, wherein the polymer of the 10 stacked layers each includes an ethylene-based polymer, a propylene-based polymer, or both.

21. An elongated member comprising at least 9 stacked and coextruded polymer layers that are continuous in profile and include at least 5 component A microlayers, and a component B microlayer interposed between each pair of adjacent component A microlayers, wherein each microlayer has a thickness less than about 50 microns, the component A microlayers and the component B microlayers have peak melting temperatures that differ by at least 5° C., the adjoining A and B microlayers differ in molecular orientation, the component A microlayers include an ethylene-based polymer or a propylene-based polymer, the component B microlayers include an ethylene-based polymer or a propylene-based polymer, the elongated member is prepared by drawing at a draw ratio of greater than 18, wherein the drawing includes a step of drawing at a temperature above the melting point of one of components A and B and below the melting point of the other component.

* * * * *